United States Patent [19]
Westerlage et al.

[11] Patent Number: 5,826,195
[45] Date of Patent: *Oct. 20, 1998

[54] DATA MESSAGING IN A COMMUNICATIONS NETWORK

[75] Inventors: Kenneth R. Westerlage, Fort Worth; William C. Kennedy, III, Dallas, both of Tex.

[73] Assignee: HighwayMaster Communications, Inc., Dallas, Tex.

[*] Notice: The term of this patent shall not extend beyond the expiration date of Pat. No. 5,544,225.

[21] Appl. No.: 700,317

[22] Filed: Aug. 5, 1996

Related U.S. Application Data

[63] Continuation-in-part of Ser. No. 465,525, Jun. 5, 1995, Pat. No. 5,544,225, which is a continuation of Ser. No. 175,256, Dec. 28, 1993, Pat. No. 5,539,810, which is a continuation-in-part of Ser. No. 95,166, Jul. 20, 1993, abandoned, which is a continuation-in-part of Ser. No. 826,521, Jan. 27, 1992, abandoned.

[51] Int. Cl.$^6$ .................................................. H04Q 7/22
[52] U.S. Cl. ........................ 455/456; 455/450; 455/456; 455/457; 455/422
[58] Field of Search ..................................... 455/422, 434, 455/435, 456, 507, 510, 557, 450

[56] References Cited

PUBLICATIONS

"Digital Cellular Telecommunications System (Phase 2); Technical Realization of Short Message Service Cell Broadcast (SMSCB)" European Telecommunication Standard May 1996.

"Digital Cellular Telecommunications System (Phase 2); Technical Realization of the Short Message Service (SMS) Point–to–Point (PP)" European Telecommunication Standard Oct. 1996.

*Primary Examiner*—Dwayne D. Bost
*Assistant Examiner*—Jean A. Gelin
*Attorney, Agent, or Firm*—Baker & Botts, L.L.P.

[57] ABSTRACT

A messaging unit (16) equipped with a cellular transceiver (38) is attached to a truck trailer (12) or a monitoring station (13) located within a communications network (10). The messaging unit (16) generates a data message in response to the occurrence of a reporting event. Upon generation of a data message, the cellular transceiver (38) transmits the data message over the network (10) via voice or data channels. Data messages may be sent over a data channel of the network (10) by altering the mobile identification number (MIN), electronic serial number (ESN), or other identifier of the cellular transceiver (38).

27 Claims, 9 Drawing Sheets

DATA MESSAGING IN A COMMUNICATIONS NETWORK

CROSS-REFERENCE TO RELATED APPLICATIONS

This application is a continuation-in-part of U.S. patent application Ser. No. 08/465,525, entitled "Data Messaging in a Cellular Communications Network," filed Jun. 5, 1995 by William C. Kennedy III and Kenneth R. Westerlage, now U.S. Pat. No. 5,544,225, which is a continuation application of U.S. patent application Ser. No. 08/175,256, entitled "Data Messaging in a Communications Network," filed on Dec. 28, 1993 by William C. Kennedy III and Kenneth R. Westerlage, now U.S. Pat. No. 5,539,810, issued Jul. 23, 1996, which is a continuation-in-part application of U.S. patent application Ser. No. 08/095,166, entitled "Method and Apparatus for a Nation-Wide Cellular Telephone Network," filed on Jul. 20, 1993 by William C. Kennedy III and Kenneth R. Westerlage, now abandoned, which is a continuation-in-part application of U.S. patent application Ser. No. 07/826,521, entitled "Phantom Mobile Identification Number Method and Apparatus," filed on Jan. 27, 1992 by William C. Kennedy III and Robert J. Charles, now abandoned.

TECHNICAL FIELD OF THE INVENTION

This invention relates generally to the field of telecommunications, and more particularly to data messaging in a communications network.

BACKGROUND OF THE INVENTION

The proliferation of sophisticated communications systems has resulted in developments in data messaging. Data messaging collectively refers to the transfer of information over voice or data channels of a communications network. One application of data messaging is the monitoring of a group of items by causing the items to send data messages to a remote location in response to a recognized reporting event. A network of cellular telephone systems is a suitable conduit for such data messaging, but the cost of using traditional cellular communication is prohibitive, both in terms of chargeable air time and roamer fees.

Another problem with using traditional cellular networks for data messaging is that the fragmentation of cellular service providers results in disintegrated monitoring and control of cellular air traffic, which often contributes to fraudulent use of the cellular telephone network. Increasing incidents of roamer fraud adds significantly to the cost of cellular air time, especially for nation-wide users of the cellular telephone network. To combat these problems, cellular service providers are implementing authorization and verification procedures for validating roaming customers.

SUMMARY OF THE INVENTION

In accordance with the teachings of the invention, a method and apparatus for data messaging in a communications network substantially eliminate or reduce disadvantages and problems associated with prior art data messaging systems.

In accordance with one aspect of the invention, a system for communicating information about an item using a cellular telephone network includes a messaging unit coupled to the item. The messaging unit has a cellular transceiver coupled to the cellular telephone network. The messaging unit alters an identifier of the cellular transceiver to reflect the information about the item and transmits the altered identifier of the cellular transceiver. A platform coupled to the cellular telephone network recognizes a received altered identifier transmitted by the messaging unit to obtain the information about the item.

An important advantage of the invention is that messaging units can send data messages using the cellular telephone network by altering the mobile identification number (MIN), electronic serial number (ESN), or other identifier of the cellular transceiver. By altering these cellular transceiver identifiers, the messaging unit can send information over existing cellular telecommunications equipment at a reduced cost and complexity. The messaging unit may communicate the altered identifier to a remote location in association with dialing a telephone number, issuing a feature request, performing pre-call validation, registering the cellular transceiver, or performing any other communication that transmits cellular transceiver identifiers.

In a particular embodiment, a messaging unit may be attached to or associated with an item to monitored. For example, a truck trailer monitoring system may use a messaging unit to communicate information on the current position and/or status of a fleet of truck trailers. Also, a monitoring station may use a messaging unit to communicate information generated by a metering device, such as a gas meter, electrical meter, other utility meter, or vending machine. In the latter example, the present invention allows flexible deployment of fixed monitoring stations in areas of cellular coverage without additional wireline or wireless equipment.

BRIEF DESCRIPTION OF THE DRAWINGS

For a more complete understanding of the invention and the advantages thereof, reference is now made to the following description taken in conjunction with the accompanying drawings, wherein.

DETAILED DESCRIPTION OF THE INVENTION

Figure 1:
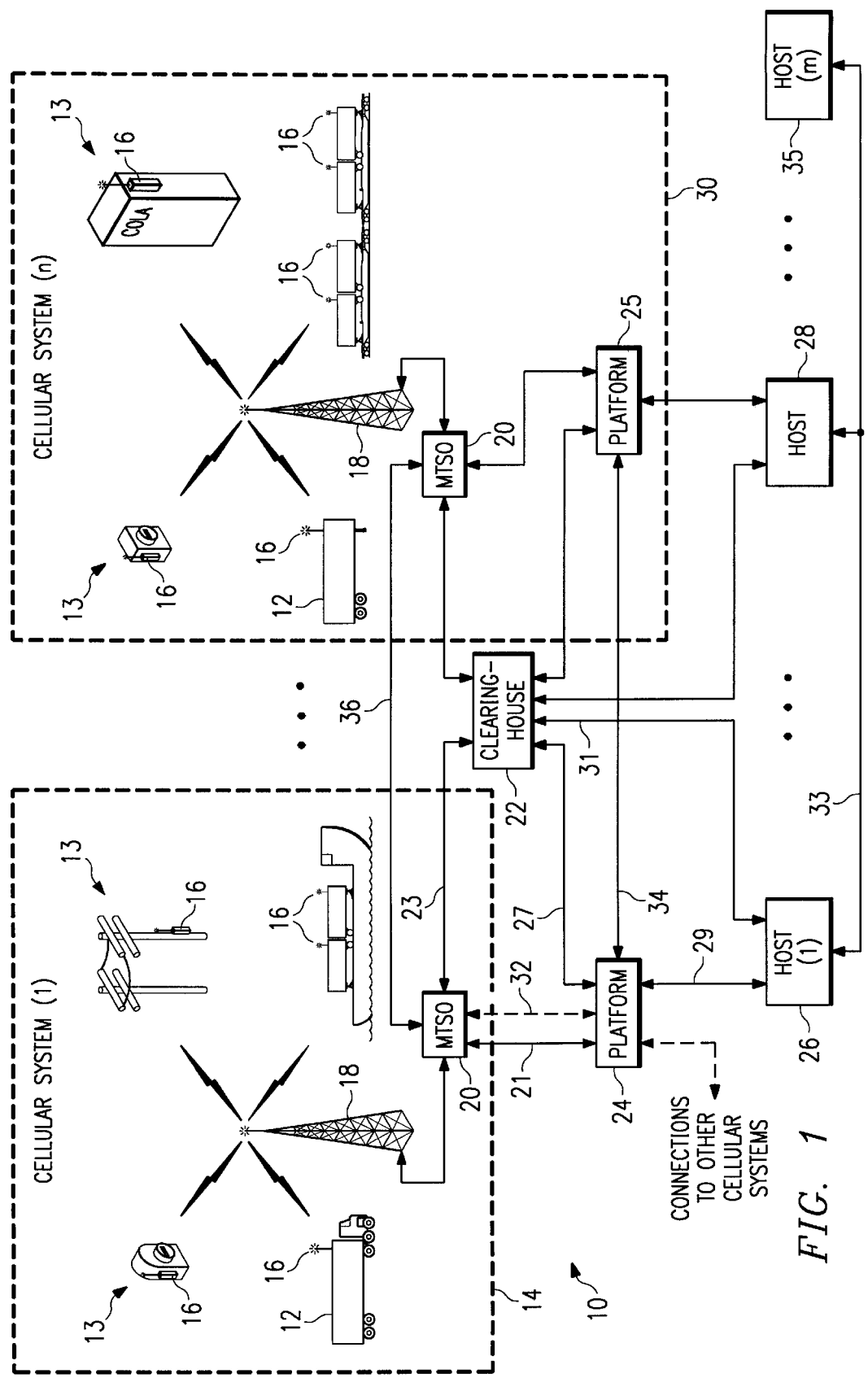
FIG. 1 is a block diagram of a communications network for communicating a variety of data messages in accordance with the teachings of the invention.

FIG. 1 is a block diagram of a communications network 10. Located within cellular system 14 of network 10 is a truck trailer 12 carried by a cab, barge, train, or other suitable transportation system. Also shown in FIG. 1 are monitoring stations 13 that are associated with a metering device, such as a gas meter, electric meter, other utility meter, vending machine, or any other metering device that generates information for communication to a remote site. It should be understood that the invention contemplates data messaging from any group of cargo containers, vehicles, persons, metering devices, or other mobile or fixed items to be monitored.

Network 10 may be a cellular telephone network, but it may also be another type of communications system, such as a specialized mobile radio (SMR) system, an enhanced specialized mobile radio (ESMR), a personal communication services (PCS) system, or any other suitable communications system. Furthermore, network 10 may be comprised of land-based transmission towers, space-based satellite transponders, or a combination of communications hardware in space or on land. Transmissions over network 10 may be analog, digital, or both without departing from the scope of the invention.

Truck trailer 12 and monitoring station 13 are equipped with a messaging unit 16, which contains a cellular transceiver for sending and receiving data messages. The design of messaging unit 16 is discussed in detail with reference to FIG. 2. Cellular system 14 includes a transmission tower 18 and a mobile telecommunications switching office (MTSO) 20 coupled to the transmission tower 18. It should be understood that each cellular system 14 may comprise a plurality of transmission towers and a plurality of MTSOs.

MTSO 20 switches calls to and from the cellular system 14 and a land-based telecommunications system (not shown). MTSO 20 is also coupled to clearinghouse 22, which provides call information to MTSO 20 through data link 23. For example, MTSO 20 can be configured to connect calls only if clearinghouse 22 provides, for example, validation information indicating that the cellular phone involved has good credit or is authorized to make calls. Clearinghouse 22 may also maintain other information, such as "roaming" phones' present locations and home systems.

In existing cellular systems, companies such as GTE/TSI, EDS, and McCaw provide the clearinghouse function. This function may also be provided by MTSO 20 or a home location register (HLR) associated with MTSO 20, clearinghouse 22, or other component in communications system 10, or provided as a separate component in communications system 10. In one embodiment, for example when communications system 10 supports a particular cellular standard called IS41, the function of clearinghouse 22 may be performed by MTSO 20. In this case, MTSOs 20 in communications system 10 may communicate with each other for purposes of call processing without the need for the functionality provided by clearinghouse 22.

MTSO 20 is coupled to a telecommunications platform ("platform") 24 through a voice/data link 21. Clearinghouse 22 is also coupled to platform 24 through data link 27 to provide platform 24 with information generated by clearinghouse 22. In turn, platform 24 is coupled to host 26 through voice/data link 29. Platform 24 may be coupled to any other host, such as host 28, through a similar voice/data link. Alternatively, hosts 26 and 28 may receive call information directly from clearinghouse 22 over data link 31.

Hosts 26 and 28 are shown for clarity, but it should be understood that many other hosts may be similarly coupled to platform 24, other platforms, other hosts, or clearinghouse 22. Link 33 between host 26 and host 28 allows hosts to exchange information. Host 35 may be connected to host 28 via link 33, such that host 35 receives information solely from host 28. In such a manner, designated hosts in network 10 act as central hosts to receive data messages and distribute these messages to other hosts.

FIG. 1 illustrates another cellular system 30, which includes a separate transmission tower 18 and MTSO 20. Within the operating region of cellular system 30 are truck trailers 12 and monitoring stations 13 equipped with messaging units 16. A platform 25 may be associated with cellular system 30, illustrating that the platform functions can be performed at distributed locations throughout network 10. However, platform 24 may perform all platform functions for all cellular systems. Moreover, as shown in FIG. 1, platform 24 may be coupled to one or more cellular systems. For example, platform 24 may be coupled to all of the West Coast cellular systems and platform 25 may be coupled to all of the East Coast cellular systems. Likewise, platform 25 is a distributed platform, and is associated with and part of a particular cellular system. Platform 25, like platform 24, is coupled to a host, such as host 28.

Dashed line 32 indicates a link between MTSO 20 and platform 24. With a proposed standard (IS41, revision A), validation of a user can be performed prior to the placing of cellular calls. For example, at power up or upon first entry into a particular cellular system, a cellular transceiver can issue identifiers to MTSO 20 for pre-validation. Alternatively, MTSO 20 can poll a cellular transceiver to provide identifiers for validation and registration. The pre-validation information may be transmitted from MTSO 20 to clearinghouse 22 over data link 23. Likewise, platform 24 may perform the pre-validation without resort to an outside clearinghouse, over link 32. With pre-call validation performed by clearinghouse 22, later data messages can be sent directly to platform 24 over link 32. It should be understood that link 32 may be the same as voice/data link 21, a separate dedicated data link, or another communications link.

Data link 34 between platform 24 to platform 25 allows distributed platforms to exchange information regarding user validation, fraud management, systems operation, and billing functions. The distributed platform embodiment also provides fault tolerant and traffic management features in network 10, not unlike those features found in conventional long-distance telephone systems. Thus, as is shown in FIG. 1, telecommunications platforms may be centrally located or arranged in a distributed manner and connected by data link 34.

Throughout this description of the invention, host 26, platform 24, clearinghouse 22, MTSO 20, and cellular system 14 have been discussed as separate elements. It should be understood that each of these components are logical components, and they may be combined without physical separation. For example, the functions of platform 24 and host 26 may be accomplished at a single site. Furthermore, the functions of platform 24 and clearinghouse 22 may also be accomplished at a single site. References to cellular system 14, MTSO 20, clearinghouse 22, platform 24, and host 26 are to be understood as also referring to any cellular system, switch, clearinghouse, platform, and host, respectively, of network 10.

Also illustrated in FIG. 1 is data link 36, which allows for data transfer between MTSOs of the cellular systems in network 10. Such a link may be an SS7 backbone link for linking cellular systems. Link 36 allows cellular systems to share information relating to validation, roaming, billing, call routing, and other functions performed by network 10. For example, one cellular system that knows the location of a particular cellular transceiver, such as the cellular transceiver in messaging unit 16, may share that information with other cellular systems. Platform 24 may tie into link 36 across link 21 or link 32 to access information exchanged among MTSOs of the cellular systems in network 10.

The description of FIG. 1 references both data links and voice/data links. Data links, such as links 23, 27, 31, 34, and 36, allow transmission of data over a dedicated data channel. Voice/data links, such as links 21 and 29, support transmission of voice over a voice channel and transmission of data over a data channel. For example, cellular telephone transmission over a voice/data link may employ digital transmission techniques to carry voice over a voice channel and data over a data channel, such as a control channel, paging channel, or overhead message stream. It should be understood that the invention contemplates any transmission technique over a voice/data link, whether digital or analog, that provides a voice channel and a data channel. Current systems used in the industry include the DS-1 standard used in the United States and the CCITT primary multiplex standard used in European telecommunication systems. Communications system 10 also supports any suitable modulation techniques, such as time division multiple access (TDMA), frequency division multiple access (FDMA), and code division multiple access (CDMA).

Another communications protocol contemplated by the invention, termed cellular digital packet data (CDPD), sends data in packets interspersed between voice transmissions. The data messages in this protocol may be carried in a reserved section of the digital bit stream or selectively placed to fill unoccupied sections of the digital bit stream. CDPD technology also supports delivery of data messages that is not real-time. This is accomplished by establishing delivery addresses, so a user may receive and store data messages at a designated address and retrieve the data messages at a later time for processing.

Voice/data links also support transmission of data over a voice channel using a modem, dual-tone multifrequency ("DTMF") tones, or other suitable data encoder. The invention contemplates two ways to send a data message in network 10, data transmission over a data channel and data transmission over a voice channel using a data encoder. It should be understood that a dedicated data channel, such as link 34, could be replaced with a link that also allows voice transmission, without departing from the intended scope of the present invention.

In operation, network 10 allows data messages to be sent across cellular systems, such as cellular systems 14 and 30, in a variety of ways. Data messages sent to or received from messaging units 16 over a voice channel in network 10 must pass through platform 24 or 25, where they are subject to a handshake protocol to minimize cellular telephone fraud and maintain secured communications.

Data messages may also be sent to or received from messaging unit 16 over a data channel in network 10. As described below, these messages are packaged and sent over a data channel as part of the call data processing or call delivery procedures. Like data messages sent over a voice channel of network 10, data messages sent over a data channel may also be subject to a security protocol. Each type of data messaging supported by network 10 will be discussed in detail with reference to FIGS. 3 and 4.

Figure 2:
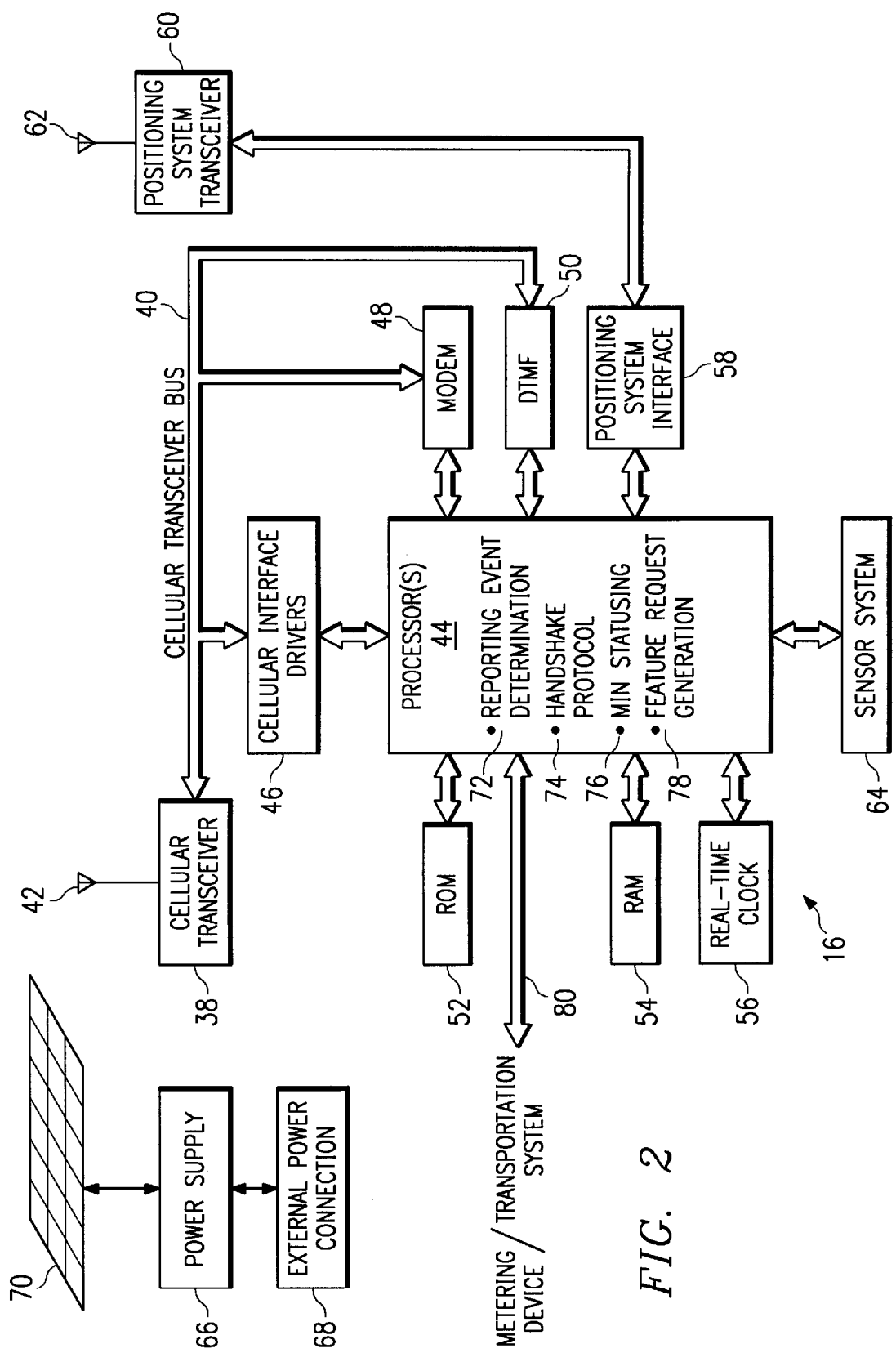
FIG. 2 is a block diagram of a messaging unit operating within the communications network for sending and receiving a variety of data messages in accordance with the teachings of the invention.

FIG. 2 is a block diagram of a messaging unit 16 operating within network 10 of FIG. 1. In one embodiment of the invention, messaging unit 16 may be attached to a mobile item, such as a truck trailer 12, cargo container, other vehicle, or person. However, it should be understood that data messaging in network 10 is not limited to truck trailer monitoring systems. Messaging unit 16 may also be attached to a fixed item, such as monitoring station 13, metering device, or any other item that generates information for communication to a remote site.

As shown in FIG. 2, cellular transceiver 38 is coupled to cellular transceiver bus 40. Cellular transceiver 38 receives and transmits signals across cellular antenna 42, including cellular transmission and reception of voice and data over the voice and data channels in network 10. Cellular transceiver 38 may be just a cellular transmitter equipped to transmit data messages or just a receiver equipped to receive data messages. It should be understood that further references to cellular transceiver 38 contemplate a transmitter, a receiver, or both.

Cellular transceiver bus 40 is coupled to one or more processors 44 through cellular interface drivers 46. Cellular interface drivers 46 provide the necessary protocol for communications between processor 44 and cellular transceiver 38.

A modem 48 allows processor 44 to receive and transmit digital communication over a voice channel in network 10, as received from and transmitted through cellular antenna 42 and cellular transceiver 38. Modem 48, or any suitable device, distinguishes between voice and data encoded on the voice channel, and handles the information accordingly.

Processor 44 is also coupled to a DTMF recognizer 50. DTMF recognizer 50 allows reception and transmission of DTMF data over a voice channel of network 10, as received from and transmitted through cellular antenna 42 and cellular transceiver 38. All data transmissions to or from messaging unit 16 can be made using DTMF data.

Processor 44 is also coupled to a read-only memory ("ROM") 52 and a random access memory ("RAM") 54. These memories are for storage of instructions and data for operation of processor 44. It should be understood that the invention contemplates use of any other suitable storage devices (not shown) including, but not limited to, hard disk and floppy disk drives, optical disk drives, CD-ROM storage devices, tape backups, and plug-in memory modules. A real-time clock 56 provides processor 44 with time-of-day, day-of-week, month, or year information.

In a particular embodiment, messaging unit 16 may provide for input of location information from a LORAN-C system, global positioning satellite (GPS) system, dead reckoning system, inertial navigation system, or any suitable system providing location information. A positioning system interface 58 provides location information to processor 44, as received from positioning system transceiver 60 through positioning system antenna 62. The location information sent to processor 44 from the positioning system can be either raw location data (for example, data directly received from a LORAN-C system) or processed location data. Therefore, the processing of raw location data can occur within the positioning system itself, within the positioning system interface 58, within processor 44, or transmitted through cellular transceiver 38 and cellular antenna 42 for later processing at platform 24 or host 26 of FIG. 1.

Messaging unit 16 also allows for input of status information through sensor system 64. In one embodiment, sensor system 64 comprises sensors, controllers, and processors used to monitor various parameters of truck trailer 12 or monitoring station 13, and operates to pass status information to processor 44. Sensor system 64 may monitor performance parameters of truck trailer 12, such as the temperature of a refrigerated compartment, battery voltage levels, or diagnostics of other truck trailer subsystems. Sensor system 64 may also monitor the status of truck trailer 12 and its contents, such as whether truck trailer 12 is connected to a cab and whether the contents have been tampered with. In a further embodiment, sensor system 64 may generate information about an item associated with monitoring station 13, such as a gas meter, electric meter, other utility meter, vending machine, or other item that generates information for communication to a remote site. For example, monitoring station 13 associated with a gas meter may generate and communicate in a data message information related to meter readings, customer usage statistics, billing information, or any other information generated at the customer premises. For purposes of this description, "sensor" refers to any device that furnishes processor 44 with information about a mobile or fixed item, including location and status information.

A power supply 66 powers the various components of messaging unit 16. For clarity, the power connections to the different components of messaging unit 16 are not shown. Power supply 66 is a power management system which may include a battery and charging circuitry. In addition, power supply 66 may include optional sources of power, such as an external power connection 68 from, for example, a truck electrical system interconnection cable, a solar cell 70, a utility connection, or other external power source. Messaging unit 16 may comprise any suitable arrangement and placement of its components in one or more separate housings attached to the mobile or fixed item.

In operation, messaging unit 16 generates a data message to be sent over voice or data channels of network 10 upon the occurrence of a reporting event. The occurrence of a reporting event is determined by processor 44 executing a reporting event determination module 72, shown as a part of processor 44 in FIG. 2. Upon the occurrence of a reporting event, processor 44 may immediately generate and transmit a data message or generate and store the data message for later transmission. By storing data messages, messaging unit 16 may then send a batch of data messages chronicling the status of truck trailer 12 or monitoring station 13 over a period of time.

One reporting event that may trigger generation of a data message is a time-out signal received by processor 44 from real-time clock 56. Therefore, messaging unit 16 may generate data messages and report information about a mobile or fixed item at a particular time interval, such as twice a day, every day, or every week, or at a scheduled time of day, week, or month. In addition, a reporting event may be an external request from a variety of sources, such as MTSO 20, clearinghouse 22, platform 24 and host 26, among others.

A reporting event may also be initiated by the transportation system, metering device, or its operator. For example, messaging unit 16 may generate and transmit a data message upon a signal, received by processor 44 from sensor system 64, indicating connection or disconnection of truck trailer 12 from the cab. Also, messaging unit 16 may generate and transmit a data message upon a signal generated by a metering device indicating connection or disconnection from a gas utility, electric utility, or other monitored system. An operator of the transportation equipment or metering device may also manually request messaging unit 16 to send a data message.

A reporting event may occur in response to a performance or alarm signal received by sensor system 64 that is beyond predetermined limits. For example, a reporting event may be when the cargo temperature in a refrigerated truck trailer exceeds a certain minimum or maximum level. Similarly, a reporting event may occur when a metering device senses malfunction, tampering, or other condition to be monitored. The predetermined limits that trigger a reporting event may be remotely configured from the clearinghouse 22, platform 24, or host 26. Processor 44 may also determine a reporting event upon improper access to the cargo hold, malfunctioning of truck trailer subsystems, or malfunctioning of messaging unit 16 itself.

Furthermore, a reporting event may be based on geographical information. For example, messaging unit 16 may generate a data message when the truck trailer location determined by the positioning system deviates from an expected truck trailer location. The expected location may be stored in memory such as ROM 52, RAM 54, or other storage device, computed by processor 44, or received from host 26 or platform 24.

In a similar manner, a reporting event may occur when truck trailer 12 approaches or crosses a city, state, or national border, or enters the service area of a cellular system. Therefore, processor 44 executing reporting event determination module 72 causes messaging unit 16 to generate a data message upon the occurrence of a reporting event. The reporting event may be based on time, external requests, sensor inputs, manual requests, geographical information, or any other event or condition that warrants reporting of a data message to host 26.

Upon determination of a reporting event, messaging unit 16 operates to transmit and receive a variety of data messages over network 10. The data messages may contain information that initiated the reporting event, such as a signal indicating connection of the truck trailer to a cab, and also other monitored information, such as the location of the truck trailer at the time of the reporting event or information about an item generated by or in association with a metering device. Ultimately data messages transmitted from messaging unit 16 are routed through platform 24, clearinghouse 22, or both and accessed by host 26, as shown in FIG. 1. A data message may be communicated over network 10 using either a voice channel or a data channel.

Messaging unit 16, through control of processor 44 may transmit and receive data messages over a voice channel through platform 24. For clarity, the transmission or reception of data messages over a voice channel, including handshaking, will be discussed in connection with modem transfers, it being understood that such transmissions can be made using DTMF tones or other data encoded on the voice channel.

The ability to require that all data messages communicated over a voice channel pass through platform 24 is an important advantage of the invention, and allows for modem handshaking between platform 24 and messaging unit 16. As shown in FIG. 2, processor 44 runs instructions that execute a handshake protocol module 74 which establishes secure data modem communication with platform 24. The method to transmit data messages over a voice channel is described in more detail with reference to FIG. 3.

Figure 4:
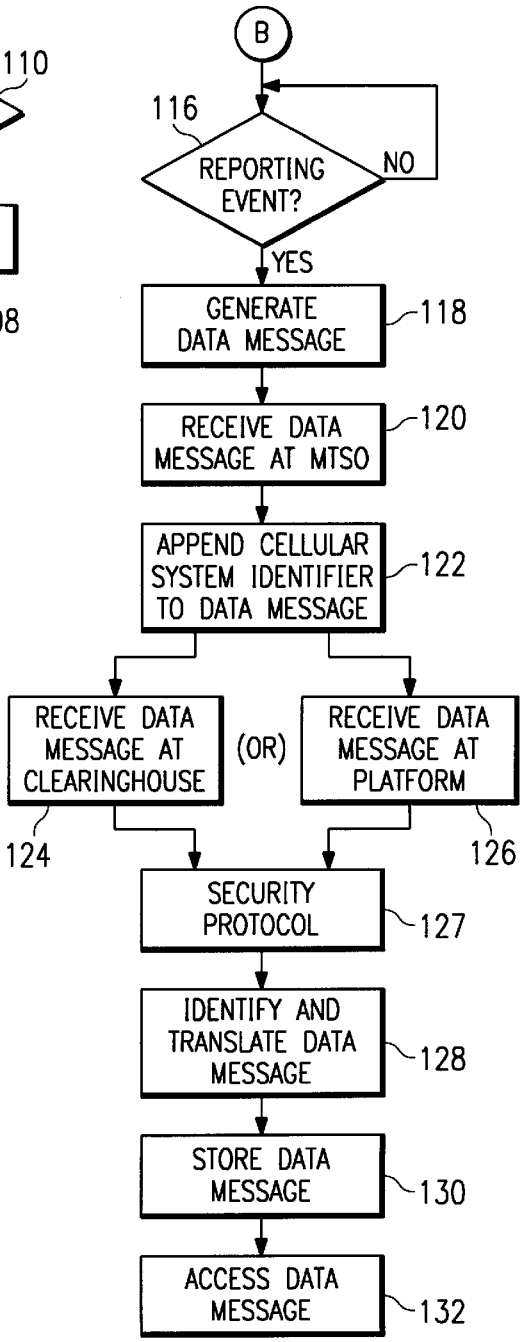
FIG. 4 is a flow diagram for sending a data message over a data channel of the communications network in accordance with the teachings of the invention.

Processor 44 also executes a MIN statusing module 76 and a feature request generation module 78, which allow messaging unit 16 to generate and transmit data messages over a data channel of network 10. As described below with reference to FIG. 4, MIN statusing module 76 allows messaging unit 16 to encode, reflect, or otherwise associate information about a fixed or mobile item by altering identifiers of cellular transceiver 38, such as the mobile identification number (MIN) or electronic serial number (ESN), transmitted over a data channel of network 10. Feature request generation module 78, also discussed with reference to FIG. 4, is another method to send data messages over a data channel by appending to a feature request data digits representing status and location information.

Link 80 between processor 44 and the transportation system or metering device allows messaging unit 16 to send and receive communications to and from, for example, a truck cab or monitoring station 13. The link may allow two-way communications using a short range radio system, an infra-red (IR) coupling, a direct connection through signal wires, or other appropriate technology. Alternatively, the link may be a one-way communications link that allows messaging unit 16 to send data messages for transmission by the transportation system. In one embodiment, a one-way link may allow a scanner attached to the transportation system to identify the attached truck trailer 12.

Functionally, link 80 allows components of messaging unit 16 to be divided between the item and its transportation system. In one embodiment, processor 44 residing on the item generates a data message and then sends this data message over link 80 for transmission by cellular transceiver 38 located on the transportation system. In such a manner, the cost of outfitting items with data messaging capabilities may be reduced by placing components of messaging unit 16 on the transportation system. It should be understood that the invention contemplates any arrangement of components of messaging unit 16 on the mobile item and the transportation system.

Figure 3:
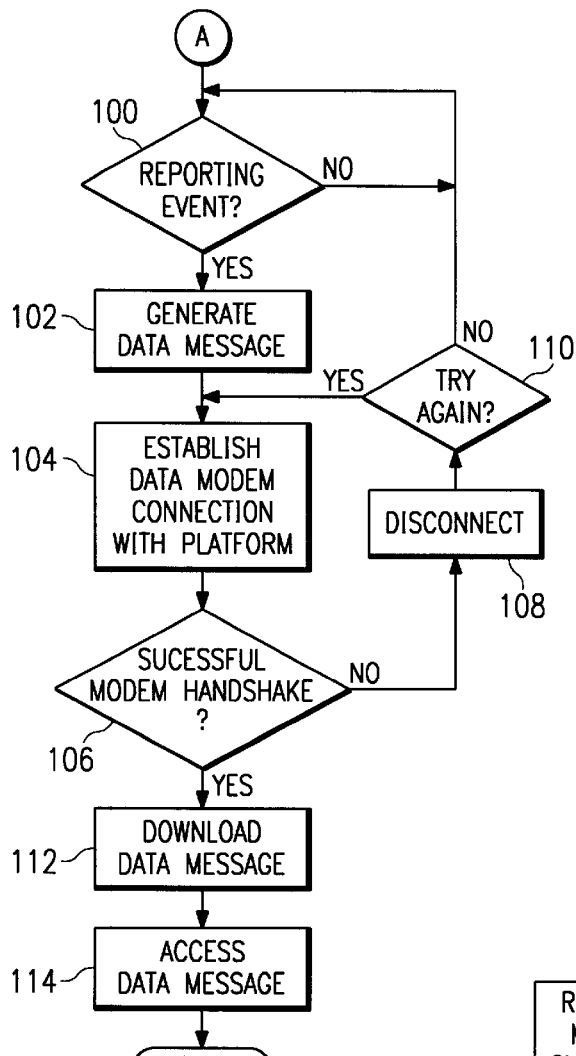
FIG. 3 is a flow diagram for sending a data message over a voice channel of the communications network using a modem handshake protocol in accordance with the teachings of the invention.

FIG. 3 is a flow diagram for sending a data message generated by messaging unit 16 over a voice channel of network 10 using a modem handshake protocol. The method begins at block 100 which determines whether one of a variety of reporting events has occurred, as determined by processor 44 running reporting event determination module 72. If no reporting event has occurred, the method loops back in a continuous fashion to monitor the existence of a reporting event. When a reporting event occurs, block 102 generates a data message. The data message may contain information about the item in a standard data package for transmission by modem 48. It should be understood that the invention contemplates any suitable modem transfer protocol and compression technique to prepare the data for transmission by modem 48.

The method of FIG. 3 then proceeds to block 104 where messaging unit 16 establishes a data modem connection with platform 24 over a voice channel of voice/data link 21 or 32. Data modem connection establishes the parameters for communication, such as baud rate, parity, and number of stop bits. After the connection is established, block 106 initiates a modem handshake between messaging unit 16 and platform 24. If messaging unit 16 does not pass the modem handshake and establish secure communications with platform 24, the method proceeds to block 108, where the communication is disconnected. At block 110, messaging unit 16 may try to reestablish a data modem connection and retry modem handshaking. Alternatively, the process may be reset for detection of another reporting event at block 100.

Upon successful modem handshake, the method proceeds to block 112 where modem 48 downloads the contents of the data message into a storage device in platform 24. The data may be time-stamped and stored as an entry in a log of data messages from messaging unit 16. Platform 24 can also index received data messages by an identification number of messaging unit 16 or cellular transceiver 38 received during modem handshaking at block 106. At block 114, an external device, such as a computer at host 26, can access the stored data messages and update a record containing information about items equipped with messaging units 16.

FIG. 4 is a flow diagram for sending a data message over a data channel of network 10 using either the MIN statusing 76 or feature request generation 78 modules of processor 44. Unlike data messaging using modem data or DTMF tones, the following discussion describes transmission of data messages through network 10 using a data channel, such as a control channel, paging channel, overhead message stream, SS7 link, or other appropriate data link. Furthermore, the data messaging techniques described below can be routed through clearinghouse 22, platform 24, or both clearinghouse 22 and platform 24.

The method of FIG. 4 begins at block 116 which determines whether a reporting event has occurred by executing reporting event determination module 72 in processor 44. If no reporting event has occurred, the method continues to monitor sensor system 64, real-time clock 56, location data received from positioning system interface 58, information received from transportation system or metering device, and other inputs to determine if a reporting event has occurred.

Upon the occurrence of a reporting event, block 118 generates a data message. As described above, data messages may be created and sent immediately or created and stored for later transmission by messaging unit 16. A data message for transmission over a data channel of network 10 may be generated in two ways. First, messaging unit 16 can encode, reflect, or otherwise associate information about the item by altering identifiers of cellular transceiver 38, such as the mobile identification number (MIN) or electronic serial number (ESN). A second way to generate a data message is by generating a feature request and appending information about the item in digits of data within the feature request. These two different ways of generating a data message are described in detail below.

The process to alter identifiers of a cellular transceiver 38 to transmit a data message, termed MIN statusing, begins with identification of the event or information to be reported and a translation of this event or information into a coded number. For example, assume processor 44 of messaging unit 16 associated with truck trailer 12 receives a reporting event signal from sensor system 64 indicating that the temperature in the refrigerator compartment of truck trailer 12 is too high. Processor 44 translates the reporting event into, for example, a two-digit status code "39". The MIN of cellular transceiver 38 may be altered to include status code "39" in a designated data field. For example, if the current MIN is "099 881 1234", then the new altered MIN with the embedded status code may be "099 880 0039". The prefix "880" indicates that the MIN has been altered to convey information about the item, and the last four digits contain the encoded information in the form of a two-digit status code "39".

In another example, processor 44 of messaging unit 16 associated with a gas meter receives a signal from sensor system 64 indicating the current reading of the gas meter. Processor 44 translates the gas meter reading into, for example, a value "134.56" representing the number of cubic feet of gas detected by the gas meter. The ESN of cellular transceiver 38 may be altered to include "134.56" in a designated data field. For example, if the current ESN is "0123456789", then the new altered ESN with the embedded value may be "1100013456". Again, a prefix "11" indicates that the ESN has been altered to convey information about the item, and the last eight digits contain the value generated by the gas meter.

In the first example above, the MIN of cellular transceiver 38 is altered to include a data message, but the ESN remains fixed to be used as an identifier of the messaging unit 16 that sends the data message. Therefore, upon receipt of the MIN/ESN, clearinghouse 22 or platform 24 can identify the messaging unit 16 by the ESN and can also receive information about the item encoded in the MIN. In the second example above, processor 44 alters the ESN of cellular transceiver 38 and keeps the MIN constant. It should be understood that the invention contemplates modification of the MIN, ESN, both the MIN and ESN, or other identifiers of cellular transceiver 38 to accomplish the dual task of encoding information about the item and identifying messaging unit 16. Also, the messaging capacity, specific encoding technique, and format and structure of the altered identifiers may depend on the specific data messaging application and the specific cellular telephone technology employed.

One of ordinary skill in the art can appreciate the reduced cost and complexity of sending information about a fixed or mobile item by altering or encoding identifiers of cellular transceiver 38. The MIN, ESN, or other identifiers may be modified using any appropriate technique. The alteration may be on a bit, byte, or multi-byte level, and can include various compression, run length encoding, error correction, or other techniques well-known in the art of digital communication to increase reliability and capacity. In one embodiment, cellular transceiver 38 may include a number assignment module (NAM) that may be programmed to accomplish the MIN statusing. Also, the present invention contemplates the retrofitting of existing equipment that may not support modification of the MIN or ESN to capture and modify the MIN/ESN before transmission to MTS0 20. The present invention contemplates any suitable technique in hardware or software to alter or modify identifiers of cellular transceiver 38.

In a particular embodiment using MIN statusing or feature code request messaging, messaging unit 16 may receive a communication from MTSO 20 indicating the success or failure of the message delivery. For example, a voice channel assign message may indicate that the data message was sent successfully. Similarly, a reorder or intercept message received by cellular transceiver 38 from MTSO 20 may indicate that the data message could not be sent. Upon receiving a communication from MTSO 20, messaging unit 16 may resend the data message, log the data message as sent, or perform any other appropriate function in response.

Cellular transceiver 38 may transmit identifiers to MTSO 20 upon a call, feature request, pre-call validation, registration of cellular transceiver 38 with the cellular telephone network, or other communication between cellular transceiver 38 and MTSO 20. Therefore, the MIN statusing techniques of the invention can be used alone or in connection with feature request data messaging, data messaging over a voice channel of network 10, or any other data messaging technique that also transmits identifiers of cellular transceiver 38.

A second way to generate a data message at block 118 is to use a feature request and append information about an item in designated data digits of the feature request. Feature requests come in several varieties. For example, some feature requests are intercepted and acted upon by MTSO 20, such as "*18" and "*19" used to establish and disconnect roaming services. Other feature requests, such as programmed speed dial numbers, are equivalent to dialing a telephone number.

A dedicated feature request intercepted by MTSO 20 may be specifically implemented to transmit data messages. Such dedicated feature requests allow messaging unit 16 to send detailed data messages containing, for example, accurate location information generated by the positioning system. As an example, a data messaging feature request termed "*71" is generated by automatically or manually dialing the star key "*", a two-digit feature request identification code "71", and twenty-nine digits of data. Furthermore, cellular transceiver 38 automatically appends the MIN/ESN to a feature request transmission. Such a feature request generated by messaging unit 16 and sent over a data channel of the cellular system would allow appended data messages of twenty-nine digits or more depending on the specific implementation.

Upon generating a data message using either MIN statusing 76 or feature request generation 78, the method of FIG. 4 proceeds to block 120 where MTSO 20 receives the data message. MTSO 20 may directly recognize the MIN/ESN or feature request identification code as identifying a data message from messaging unit 16. For example, MTSO 20 may be directed to recognize and process in a special manner all communications from a particular predetermined portion of the MIN/ESN, such as all MINs beginning with "099 880". Alternatively, MTSO 20 may be directed to recognize and process in a special manner all feature request transmissions with a particular feature request identification code, such as "71".

In another embodiment, MTSO 20 may contain a separate processor that indirectly monitors the call transactions through MTSO 20. The separate processor may also recognize and process data messages from messaging unit 16 in the same manner described above. In either situation, MTSO 20 appends a mobile serving carrier I.D. ("MSCID") to the MIN/ESN at block 122 and routes the data message to clearinghouse 22 over data link 23 or platform 24 over voice/data link 21 or 32.

In one embodiment, the data message is received directly at clearinghouse 22, as shown in block 124. In another embodiment shown in block 126, the data message is received at platform 24 directly through voice/data links 21 or 32, or indirectly through data link 27 from clearinghouse 22. An optional security protocol is performed at block 127 to ensure the authenticity of the data message. At block 128, the method identifies the particular messaging unit 16 that is reporting the data message using the MIN/ESN or other identifiers of cellular transceiver 38 or messaging unit 16. The data message is then recognized, translated, or decoded to obtain the information about an item reported by messaging unit 16. This step of obtaining information about the item may be performed at platform 24, clearinghouse 22, or MTSO 20. In a particular embodiment, MTSO 20 may be equipped with a home location register (HLR) that, among other things, provides the processing to obtain this information.

The method of FIG. 4 continues at block 130 where each data message may be time-stamped, indexed by identification number, and stored for later retrieval. The method of FIG. 4 concludes at block 132, where an external device, such as a computer at host 26, can access the stored data messages and update a record containing information about the items equipped with messaging units 16, and thus allow appropriate responses to the data messages.

Throughout the discussion of FIGS. 3 and 4, the data messages are transmitted by messaging unit 16 to be collected at a central location, such as clearinghouse 22, platform 24, or host 26. It should be understood that messaging unit 16 equipped with cellular transceiver 38 may also receive data messages from a central location. The data messages may be sent from a central location to messaging unit 16 over a voice or data channel of network 10 and in a similar manner as described above with reference to FIGS. 3 and 4. For example, data messages received by messaging unit 16 may be sent over a data channel using MIN statusing or feature request generation, over a voice channel using a data encoder such as a modem or DTMF recognizer, or by encoding data in a page request or other call processing communication from MTSO 20 to messaging unit 16. Received data messages at messaging unit 16 may serve a variety of functions, such as remotely programming predetermined sensor reporting limits, updating messaging unit 16 software, requesting information, operating metering device or monitoring station 13, or alerting the operator of the transportation system, among others.

Figure 5:
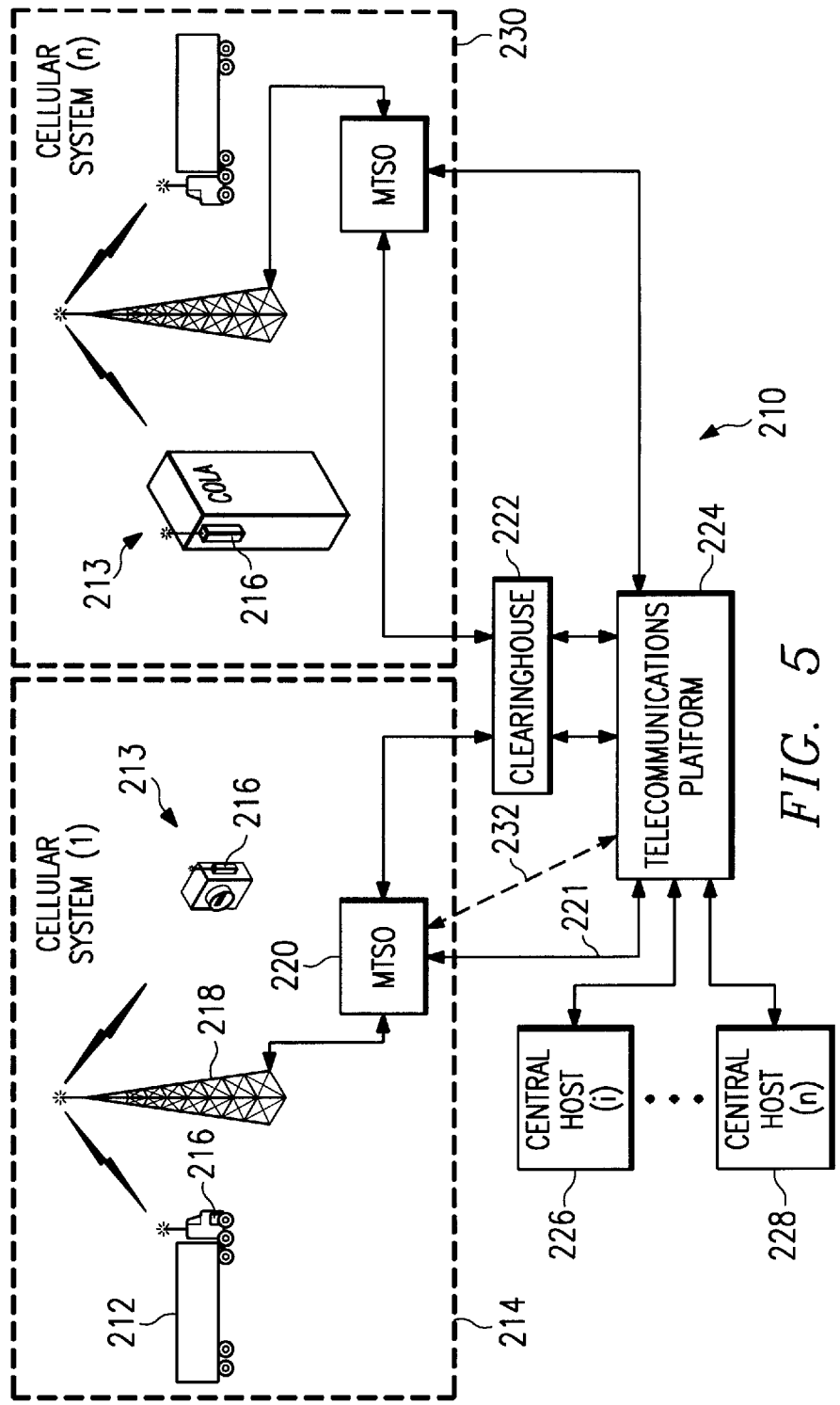
FIG. 5 illustrates a block diagram of a nationwide cellular system constructed according to the teachings of the present invention.

FIG. 5 is a block diagram of a nation-wide cellular network 210 constructed according to the teachings of the present invention. As shown in FIG. 5, a vehicle 212 and a monitoring station 213 is within cellular system 214. Vehicle 212 and monitoring station 213 include a communication unit 216, which will be discussed in detail below. Cellular system 214 includes transmission towers 218 (only one tower is shown for clarity, it being understood that each cellular system includes a plurality of transmission towers). Cellular system 214 also includes a central mobile telecommunications switching office (MTSO) 220 coupled to the transmission tower 218.

MTSO 220 switches calls to and from the cellular system 214 and the land based telecommunications system. MTSO 220 is also coupled to clearinghouse 222. The link between MTSO 220 and clearinghouse 222 is a data link, and clearinghouse 222 provides call validation information to MTSO 220. For example, MTSO 220 can be configured to connect calls only if clearinghouse 222 provides validation information on the call, such as that the cellular phone involved has good credit, or is authorized to make calls. Clearinghouse 222 may also maintain other information, such as information on "roaming" phones' present locations, and home systems. In existing cellular systems, companies such as GTE/TSI, EDS, and McCaw provide the clearinghouse function.

MTSO 220 is also coupled to telecommunications platform ("platform") 224 through a telecommunications link 221 allowing both voice and data transmissions. Clearinghouse 222 is also coupled to platform 224. In turn, platform 224 is coupled to central hosts 226 and 228. Central hosts 226 and 228 are shown for clarity. It should be understood that many other central hosts may be similarly coupled to platform 224. Furthermore, other cellular systems will also be coupled to telecommunications platform 224. For clarity, FIG. 5 illustrates one other such cellular system, cellular system 230. As shown, cellular system 230 also includes transmission towers and an MTSO.

Dashed line 232 indicates a link between MTSO 220 and platform 224. With a proposed standard (IS41, revision A), validation of calls can be performed prior to the placing of cellular calls. For example, at power up, or upon first entry into a particular cellular system, a cellular phone can issue its identification numbers, and pre-validation can be performed. Alternatively, the MTSO 220 can poll communication unit 216 to request identification for validation and registration. The pre-validation may be between MTSO 220 and a clearinghouse, such as clearinghouse 222. Likewise, platform 224 may perform the pre-validation without resort to an outside clearinghouse, over link 232. With pre-call validation performed by clearinghouse 222, later data transmissions, such as feature requests, can be sent directly to platform 224 over link 232. It should be understood that link 232 may be the same as link 221.

In operation, nation-wide cellular network 210 operates to control access to and information sent across cellular systems such as cellular systems 214 and 230. In particular, all calls to or from communication unit 216 must pass through telecommunications platform 224. In one embodiment, communication unit 216 may be associated with certain class of service restrictions maintained by the cellular carrier that specify that all calls made from communication unit 216 be directed to platform 224. Therefore, calls to and from communication unit 216 are controlled to limit access to and time on cellular system 214. The details of this control will be discussed below.

Figure 6:
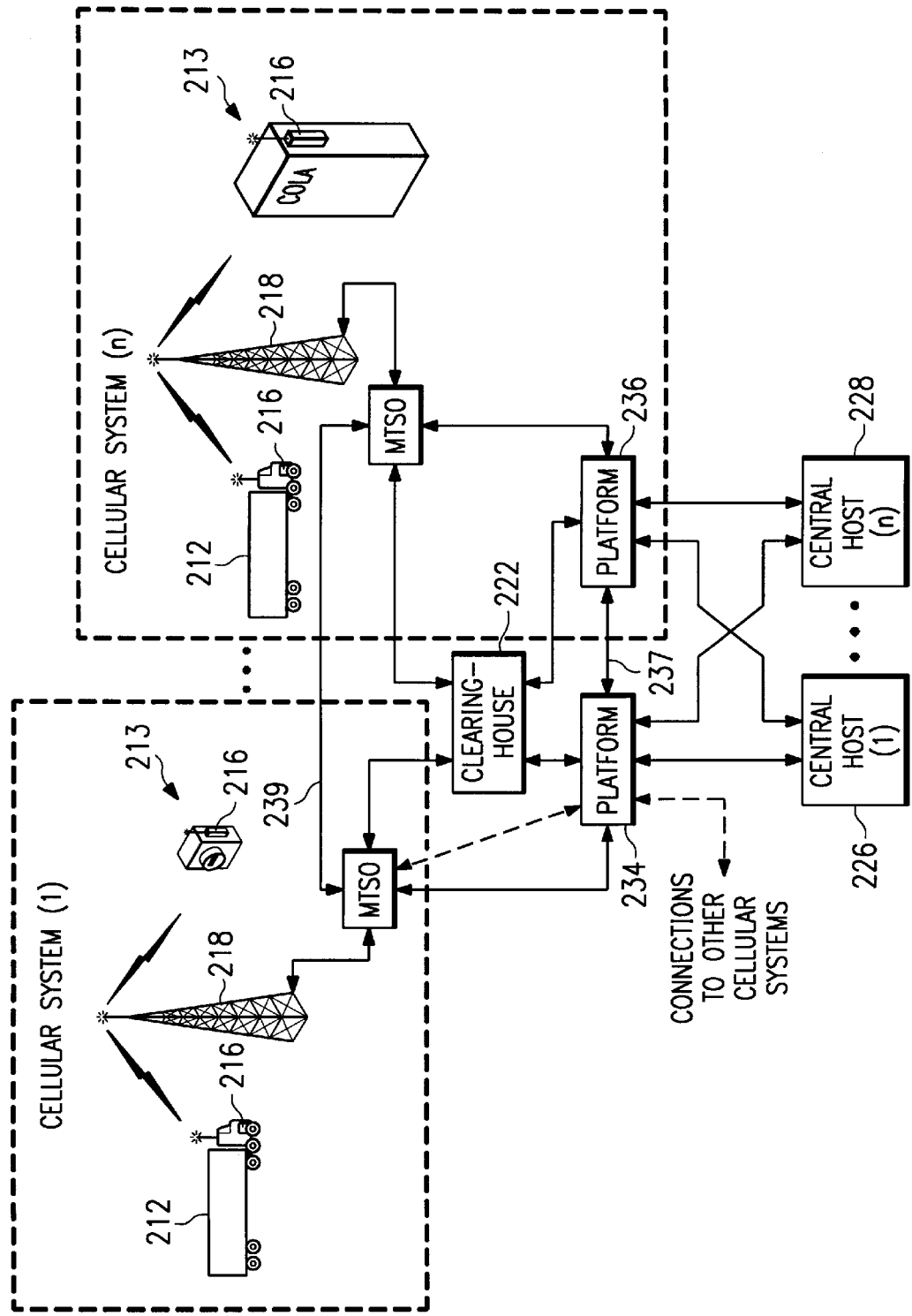
FIG. 6 illustrates another embodiment of a nationwide cellular system constructed according to the teachings of the present invention.

FIG. 6 illustrates an alternate embodiment of the present invention which includes distributed telecommunications platforms. FIG. 6 includes the elements described above in connection with FIG. 5, with the exception that the telecommunications platform is distributed. Illustrated in FIG. 6 are platforms 234 and 236. In contrast to platform 224 of FIG. 5, which is centrally located and to which all cellular systems are connected, platforms 234 and 236 may be distributed throughout the nation-wide cellular network. As shown in FIG. 6, platform 234 may be coupled to one or more cellular systems. For example, platform 234 may be coupled to all of the West Coast cellular systems and platform 236 may be coupled to all of the East Coast cellular systems. Likewise, platform 236 is a distributed platform, and is associated with and part of a particular cellular system.

Also shown in FIG. 6 is a communications link 237 from platform 234 to platform 236 that allows the distributed platforms to exchange voice and data, which may include user activity, systems operation, and billing functions. In particular, the distributed platforms 234 and 236 can exchange information regarding user validation and fraud management. The distributed platform embodiment also provides fault tolerant and traffic management features to the nation-wide cellular telephone system, not unlike those features found in conventional long-distance telephone systems. Thus, as is shown in FIGS. 5 and 6, telecommunications platforms may be centrally located or distributed, as required by the needs of the particular system implementing the present invention.

Also illustrated in FIG. 6 is link 239. Link 239 allows for data transfer between MTSOs of various cellular systems. Such a link may be an SS7 backbone link for linking cellular systems. Link 239 allows cellular systems to share information such as validation, roaming information, billing, and call routing, among other types of information. For example, one cellular system that knows the location of a particular cellular phone, such as communication unit 216, may share that information with other cellular systems. Platform 224, across link 232, may tie into link 239. This allows platform 224 to have access to all MTSO 220s of different cellular systems.

Figure 7:
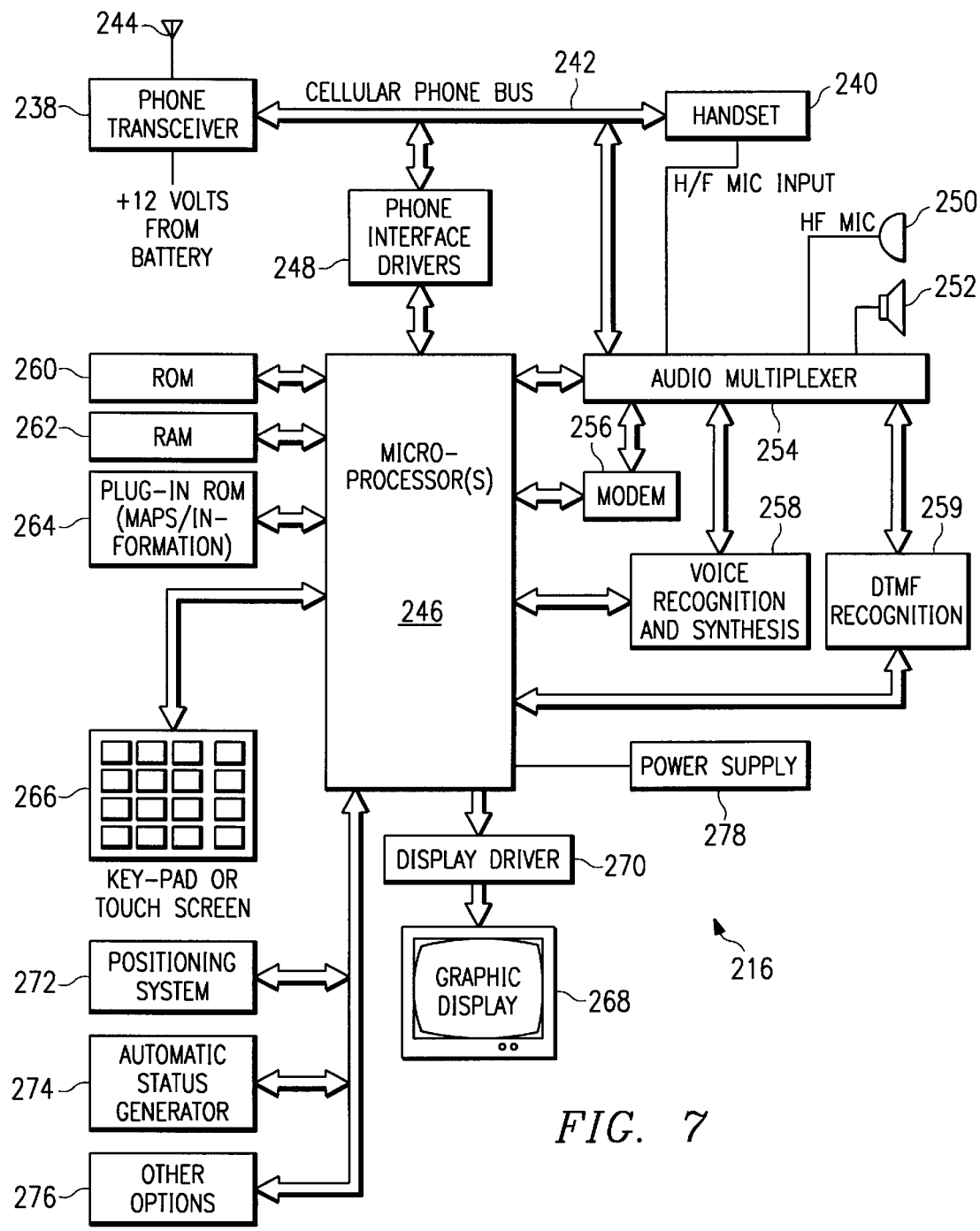
FIG. 7 illustrates a communication unit constructed according to the teachings of the present invention.

FIG. 7 illustrates a communication unit 216 constructed according to the teachings of the present invention. Communication unit 216 includes all of the functions of messaging unit 16 illustrated in FIG. 2, but contains additional components to provide interactive telephone and data services to the user. In one embodiment, messaging unit 16 may operate without user intervention and communication unit 216 supports user interaction. As shown in FIG. 7, phone transceiver 238 and hand set 240 are coupled to cellular phone bus 242. Phone transceiver 238 receives and transmits signals across antenna 244, including cellular transmission and reception of voice, data, and DTMF data, among other signals. The cellular phone bus 242 is coupled to processor 246 through phone interface drivers 248. Phone interface drivers 248 provide the necessary protocol for communications between the processor 246 and the phone transceiver 238 and hand set 240.

A hands-free microphone 250 and speaker 252 are provided for hands-free communications by the operator of the communication unit. The hands-free microphone 250 and speaker 252 are coupled to audio multiplexer 254. Audio multiplexer 254 is also coupled to the hand set 240, the cellular phone bus 242, and the processor 246. The audio multiplexer 254 is also coupled to a modem 256 and a voice recognition and synthesis system 258. The modem 256 allows for digital communication between the processor 246 and the cellular system, as received from and transmitted through antenna 244 and phone transceiver 238. Modem 256, or any suitable device, is used to distinguish between voice and data and handle the information accordingly. Voice recognition and synthesis system 258 allows for voice activation of various functions of the communication unit. Voice recognition and synthesis system 258 is coupled to processor 246.

Processor 246 and audio multiplexer 254 are also coupled to a dual-tone multi-frequency ("DTMF") recognizer 259, which allows for recognition of DTMF data. All data transmissions to or from communication unit 216 can be made using DTMF.

Communication unit 216 also allows for reception and storing of telephone numbers. These numbers may be received as modem or DTMF data, and may be recalled and automatically dialed. Furthermore, processor 246 of communication unit 216 can execute software allowing for voice mail functions for calls to communication unit 216.

Processor 246 is also coupled to a read-only memory 260 and a random access memory 262. These memories are for storage of instructions and data for operation of processor 246. Furthermore, a plug-in ROM module 264 may also be coupled to processor 246 for optional information, such as map and emergency assistance information for a particular locality.

A key pad 266 is provided for user input of various information into the communication unit 216 through processor 246. It should be understood that key pad 266 could comprise many other input devices, such as a touch screen. Information is displayed at communication unit 216 through graphic display 268, which is driven by processor 246 through display drive 270.

Communication unit 216 allows for input of location information from a LORAN-C system, a global positioning satellite (GPS) system or any suitable system providing location information of the communication unit. This input is shown by positioning system 272 in FIG. 7. The positioning system 272 may be located within the housing of the communication unit 216, or part or all of positioning system 272 may be located outside the communication unit 216. The data sent to the communication unit 216 from positioning system 272 can be either raw location data (for example, data directly received from LORAN-C system) or processed location data. Therefore, the processing of raw location data can occur within the positioning system 272 itself, within processor 246, or transmitted through phone transceiver 238 and antenna 244 for later processing at the platform 224 or central host 226 of FIG. 5.

Communication unit 216 also allows for input of status information through automatic status generator 274. The automatic status generator 274 comprises any sensors, controllers, and processors used to monitor performance parameters of the vehicle 212 or monitoring station 213, and operates to pass information from such monitors to communication unit 216. As will be discussed, status information may be received by the communication unit 216 from either the automatic status generator 274 or the key pad 266. Block 276 allows for the input or output of various other options, such as an alarm input which, for example, could indicate that a vehicle or metering device on which the communication unit 216 is located has been broken into. As other examples, block 276 allows for the input or output of fax data or digital data to or from a modem. Such inputs and outputs may be from personal computers, for example, from users of recreational vehicles or traveling salesmen. Throughout this discussion, data communications, including handshaking, will be discussed in connection with modem transfers for clarity, it being understood that such transmissions can be made as DTMF data. A power supply 278 powers the communication unit 216.

In operation, communication unit 216 operates to transmit and receive information, including voice and data, across a cellular system and through telecommunications platform 224 of FIG. 5. Ultimately, data transmitted from communication unit 216 is sent through platform 224 to one of the central hosts, for example central hosts 226 or 228 shown in FIG. 5.

Communication unit 216, through control of processor 246, receives all calls through telecommunications platform 224, and makes all outgoing calls through telecommunications platform 224. This restriction is accomplished through use of a handshake protocol. The details of this protocol will be discussed below in connection with calls to or from the communication unit. The ability to require that all calls to and from the communication unit pass through platform 224 is an important advantage of the present invention, and allows for control of the character and length of calls made to and from the communication unit. This is important in reducing cellular telephone usage costs, for example for a nation-wide trucking company, in which the trucking company provides communication units in each of the trucks of the fleet, and wishes to restrict the character and length of calls from and to the communication units.

The communication unit 216 allows for transmission and reception of both voice and data. The voice transmissions, once a call is connected, are performed conventionally. Hands-free microphone 250 and speaker 252 allow for hands-free voice communications.

Data received by communication unit 216 is input to the processor 246 through modem 256. Data transmitted from communication unit 216 is transmitted under control of the processor 246 through modem 256. Data to be transmitted from communication unit 216 may be input in several ways. Key pad 266 may be used by a user of the communication unit 216 to input various data, such as location data or status data (for example, whether a vehicle is broken down, whether it is loading, unloaded, waiting to load, waiting to unload, whether a meter has been read, disconnected, or reset, etc.). Such data may also be input by voice command through voice recognition and synthesis system 258. Data may also be automatically generated for output by communication unit 216. For example, positioning system 272, which may comprise a LORAN-C positioning system, a GPS system, or any other positioning system, may generate position location information for transmission by communication unit 216.

As discussed above, positioning system 272 may generate longitude and latitude information, or simply raw data, for example from a GPS system, to be transmitted from communication unit 216. If only raw data is generated by a positioning system 272, then processor 246, the platform 224, or the central host 226 can generate the longitude and latitude information for positioning information. Likewise, automatic status generator 274 may be used to automatically generate status information, such as engine performance, trailer temperature (for example, if a refrigerated trailer tractor is associated with the communication unit), or other status information.

Processor 246 drives graphic display 268 through display driver 270 to display data received by communication unit 216 for viewing by a user of communication unit 216. Such data, for example, may be messages from a central host on weather conditions, delivery or destination instructions, among other messages. Furthermore, plug-in ROM 264 provides various information, such as map information or emergency assistance information for use by a user of the communication unit 216. This information can be displayed on graphic display 268.

Figure 8:
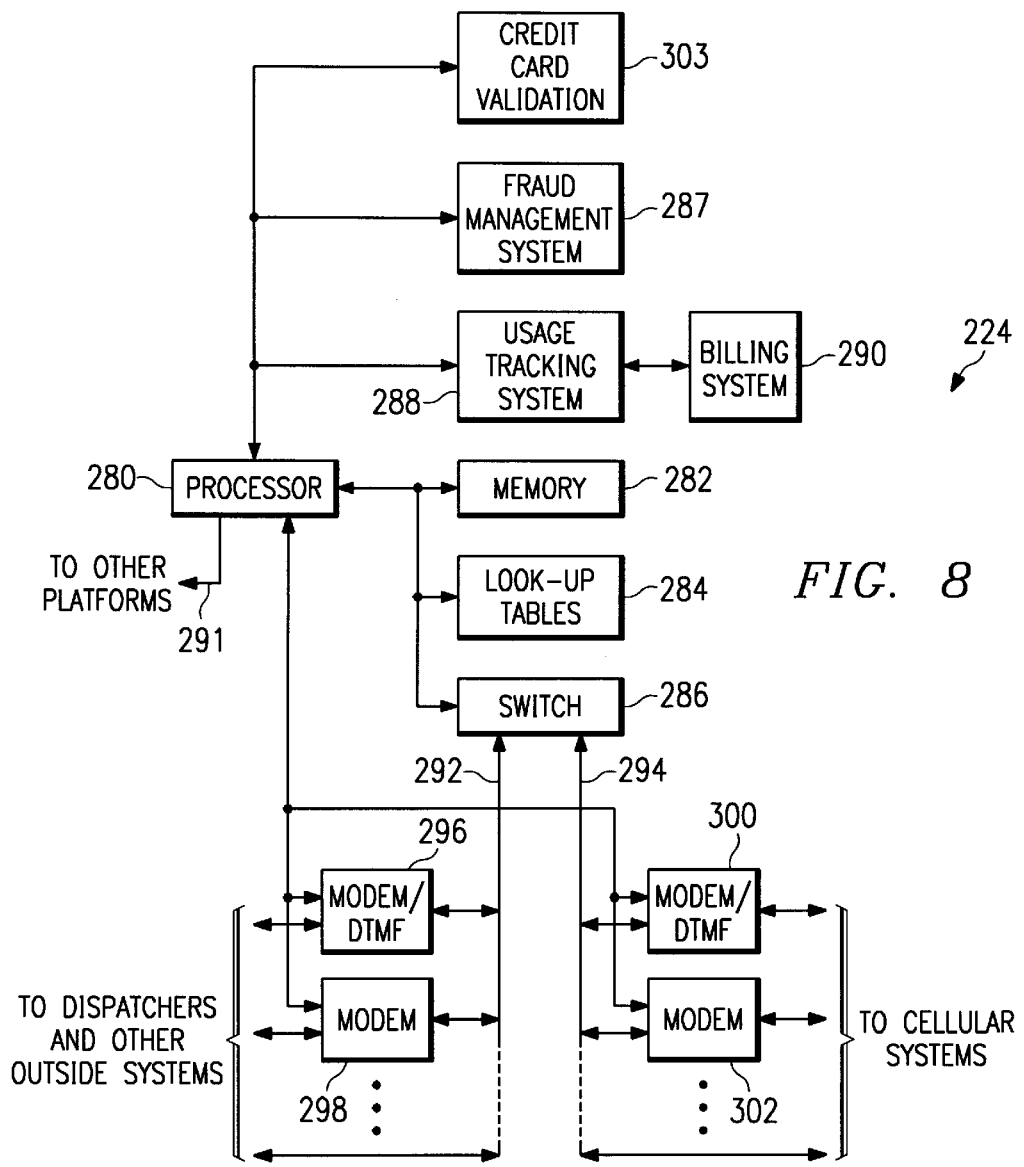
FIG. 8 illustrates a telecommunications platform constructed according to the teachings of the present invention.

FIG. 8 illustrates a block diagram of telecommunications platform 224 constructed according to the teachings of the present invention. A processor 280 is coupled to memory 282, look-up tables 284, and switch 286. Processor 280 is also coupled to fraud management system 287, usage tracking system 288, and billing system 290. In the distributed platform embodiment of FIG. 6, processor 280 may also communicate with another platform through communications link 291. Switch 286 is coupled to telecommunications trunks 292 and 294. Trunk 292 allows for telecommunications connections to central hosts, such as central hosts 226 and 228 of FIG. 5, as well as other outside land-based systems. As shown in FIG. 8, some of the individual telecommunications lines of trunk 292 are coupled to modems, such as modems 296 and 298, thus allowing for data communications. Likewise, trunk 294 allows for telecommunications connections with various cellular systems, such as cellular systems 214 and 230 of FIG. 5. Some of the individual telecommunications lines are coupled through modems, such as modems 300 and 302, so as to allow for data communications with the cellular systems. Modems 296 and 300 are illustrated as MODEM/DTMF, to indicate that DTMF data can be transmitted and received as well. Modems 296, 298, 300 and 302 are coupled to processor 280 and can also operate to allow both voice and data communications. Trunks 292 and 294 are separated for clarity to show one bank of telecommunications lines serving dispatchers and other outside systems while another bank serves cellular systems. However, switch 286 can contain a single trunk or several trunks to accomplish the operations of the platform.

Telecommunications platform 224 operates as a smart telecommunications switch. Calls to and from communication unit 216 are passed through switch 286. Processor 280 monitors switch 286 and records information on each call through switch 286. This information, such as the number and length of calls to each communication unit 216, is recorded in usage tracking system 288. In this manner, bills can be generated for usage of telecommunications platform 224. Typically there will be several communication units associated with a particular system, such as a trucking system or utility meter monitoring system. Thus, all calls to and from communication units owned by a system will be logged for billing to that particular system.

As discussed previously, a fraud management system 287 performs a handshake protocol between the telecommunications platform 224 and the communication unit 216. This protocol ensures than only authorized calls are made to and from communication unit 216. If the handshake protocol is not performed correctly, then processor 280 will disconnect the call through switch 286, thereby greatly reducing costs resulting from unauthorized usage of cellular networks. Processor 280 also links to credit card validation system 303, to validate credit cards for allowing for personal calls, as will be discussed.

Figure 9:
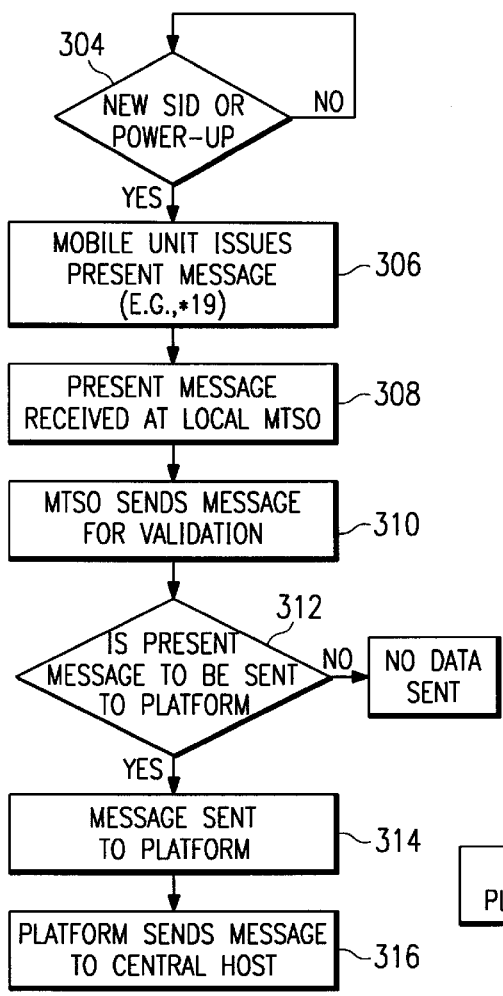
FIG. 9 is a flow diagram for transmission and reception of a present message according to the teachings of the present invention.

FIG. 9 is a flow diagram for transmission and reception of a "present" message according to the teachings of the present invention. Communication unit 216 of the present invention, upon entry into a new cellular system, issues a present message which will eventually be sent to its central host. The "present" message can also be generated in response to a poll from platform 224 or MTSO 220, periodically, upon power up of communication unit 216 upon re-establishment of communication, through use of a feature request reserved for the "present" message, or during pre-call or post-call validation, among other events. This "present" message can also be sent automatically or manually, and provides information to the central host on the current cellular system in which the communication unit is located. Furthermore, other information, such as status information, can be sent with this "present" message. An important technical advantage of the present invention is the fact that this "present" message may be sent automatically, and with a minimum of cellular air time, thus providing significant cost savings. The "present" message may be sent to platform 224 through clearinghouse 222, through link 221 (for example, as part of a call), or through link 232 of FIG. 5.

Turning to the flow diagram of FIG. 9, at decision block 304, communication unit 216 monitors the system identification number of the particular cellular system in which it is located. This system identification number, as is generally known in the art, is periodically issued by the cellular system in the control channel, paging channel, overhead message stream, or other appropriate data channel. Once the communication unit 216 identifies a new system identification number, indicating that the communication unit has entered a new system, it issues a "present" message at block 306. For example, the "present" message can be initiated by transmitting a "*19" feature request. Presently, "*19" is used in mobile systems to clear the roaming status of a cellular phone. As discussed above, the "present" message can also be generated upon other events, such as power up of the communication unit 216.

Every cellular phone has associated with it a mobile identification number ("MIN") and an electronic serial number ("ESN"). These numbers are transmitted by the cellular phone whenever it makes a call or issues a feature request, such as "*19." Certain digits of the ESN are used by local cellular carriers. The unused digits may be used by communication unit 216 to send information, such as location or status data. For example, longitude and latitude data can be embedded in the unused portion of the ESN. Likewise, certain digits of the MIN may not be necessary to identify calls to be directed to platform 224, and thus data may be embedded in these unused digits. Thus, the "present" message may contain important data as well. At block 308, the "present" message is received at MTSO 220 of FIG. 5. The MTSO 220 typically appends the cellular system identification number plus a switch identification number to the MIN and ESN numbers. As discussed, the "present" message may also be sent as part of a call from the communication unit 216, and thus is sent to platform 224 across link 221.

When the "*19" is received at the clearing house 222 at block 310, it will determine whether the "present" message is to be sent to the telecommunications platform 224 at block 312. If the "present" message is not to be sent to the platform, then no data is sent. The clearinghouse 222 determines whether the "present" message is to be sent to the platform 224 by matching all or a portion of the MIN/ESN of the communication unit to numbers stored in a pre-established user data base. This data base is established by making arrangements with the clearinghouse 222 that all communications from particular cellular phones, i.e., the communication units 216, will be recognized by their MIN/ESN and directed to the platform 224. This data base can also be established such that even with a communication unit registered at some home cellular system, the "present" message will be directed to the platform 24.

As discussed above, a direct link 232 may exist between MTSO 220 and platform 224. This link 232 allows for direct transmission of data and feature requests, such as the "*19" feature request and "present" data message, to the platform 224. MTSO 220 can be configured to directly send such transmissions by pre-arranging with MTSO 220 to recognize particular communication units 216, or by forwarding such instructions from clearinghouse 222 as part of a pre-call validation scheme.

One embodiment allows the clearinghouse 222 to identify the communication units 216 by a specified area code and prefix of the MIN. Upon matching the registered communication units 216 with the user data base in the clearinghouse 222, the "present" message is sent to the platform 224 at block 314. The platform then timestamps and stores all "present" messages received from communication unit 216 through the local carrier. The platform stores the data under each MIN/ESN for later transmittal to the central host. For example, a single communication unit 216 on a truck travelling across the country may send numerous "present" messages to the platform as the truck passes through different cellular systems. The platform 224 maintains a timestamped chronological list of the "present" messages, so the truck company dispatch can access the list, determine the location and status of the truck, graph its route over time on a map display, and/or compute travel statistics of the truck.

The platform 224 of FIG. 8 eventually sends this information to the particular central host associated with the communication unit 216 as shown at block 316. This transfer of data can occur periodically, such as at a particular time interval, upon request by a central host, or whenever a call connection is made between a central host and the communication unit 216. It should be understood that there will typically be a plurality of communication units associated with a particular central host. For example, the central host may be a truck company dispatch that locates and coordinates the activities of a fleet of trucks equipped with communication units 216. Thus, data can be down loaded from the platform 224 to the truck company dispatch anytime a call is made between the dispatch and any of the trucks. Alternatively, the truck company can periodically call the platform, preferably when call rates are low or on a dedicated or "800" number, and download a data package containing status and location information on the truck fleet. From the "present" message, the central host can determine at least which cellular system a particular communication unit has entered. This information is available since the MTSO 220 appends information to the MIN/ESN. Such information may be, for example, a mobile serving carrier I.D. ("MSCID"). Furthermore, any data, including specific location data generated by positioning system 272 or automatic status generator 274, embedded in the ESN/MIN can be extracted by the central host.

The ability to generate "present" messages provides a significant advantage of the present invention. In particular, one central location—the platform 224—maintains these "present" messages and thus has knowledge of the location (at least the cellular system location) of various communication units. This information allows for efficient and inexpensive call delivery. By directing calls to the communication units through the platform 224, roaming difficulties are eliminated, since the platform 224 maintains a record of the locations of the communication units 216. This call delivery advantage is useful in a wide range of applications, such as the broadcasting of messages to distributed communication units, like those used in trucking companies, barges, travelling sales forces, rail systems, commercial and private bus lines, airplanes, and rental vehicles, among others. The architecture of the present invention also allows for efficient broadcasting of messages to monitoring stations 213, such as utility metering systems, vending machines, and distributed advertising systems. For example, billboards for lotteries can be programmed to automatically display the jackpot amount. This amount can be sent across cellular networks, with the calls being made through platform 224.

Figure 10:
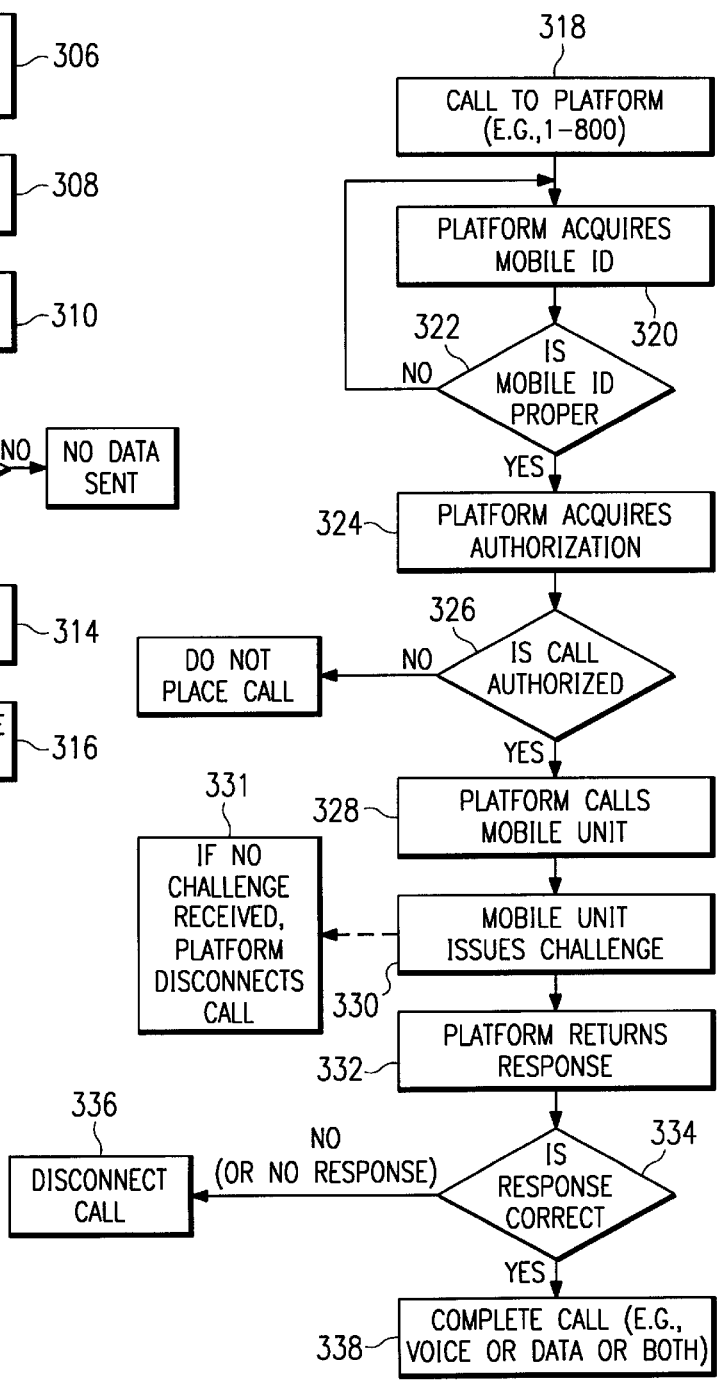
FIG. 10 is a flow diagram of a call to a communication unit according to the teachings of the present invention.

FIG. 10 is a flow diagram of a call made to a communication unit according to the teachings of the present invention. FIG. 10, along with FIG. 11 to be discussed below, describe the operation of the fraud management system 287 and the protocol handshake mentioned above. Without a successful handshake, a call cannot be connected either to or from a communication unit.

As shown in FIG. 10, a call to a communication unit is first made by placing a call to the platform at block 318. This call is, for a example, a 1-800 call, thereby reducing costs to those calling the platform. At block 320 the platform requests a communication unit I.D. for the communication unit to be called. This communication unit I.D., for example, could be a truck identification number for communication units placed on trucks. If no communication unit I.D. number is received or the communication unit I.D. is not proper, then decision block 322 returns the flow to block 320. If the communication unit I.D. is proper, then the platform acquires authorization information at block 324. Authorization information may be, for example, a credit card number or an authorized code. For example, personal calls made to the communication unit would only be initiated if the caller to the platform gave a valid credit card number. Validation of the credit card number may be accomplished through credit card validation system 303 of FIG. 8. For business calls coming from an associated central host, authorization can occur by entering an authorized code, or by calling in on a special business line, for example. This authorization occurs at block 326.

If the call is authorized, then the platform calls a communication unit at block 328. Platform 224 uses look-up tables 284 of FIG. 8 to associate the phone number of the communication unit to be called with the communication unit I.D. Platform 224 then looks up the most recently recorded cellular system identification number and switch identification number associated with communication unit 216, such as that provided by the most recent "present" message issued by communication unit 216 and stored by platform 224. Platform 224 then calls the appropriate roamer access port, and dials the phone number. Once the call is connected and the platform and communication unit modems establish data communication, the communication unit 216 issues a challenge at block 330. This challenge may be, for example, a random number. If no challenge is received, then the platform 224 disconnects the call at block 331. If the platform receives a challenge, then at block 332 the platform returns a response based on the challenge received, a key particular to the communication unit, and an encryption algorithm. As noted, the key used in the generation of the response is a function of the communication unit and may be generated from a lookup table of numbers shared by both communication unit 216 and platform 224 indexed by the MIN/ESN of communication unit 216. The encryption algorithm, also known by both communication unit 216 and platform 224 can be any appropriate mathematical algorithm, and may be modified periodically, as can the lookup table, to maximize security.

At block 334, the platform determines whether the response is correct by running the same encryption algorithm on the challenge and key. If the response is not correct, or if no response is received, then the call is disconnected at block 336. U.S. Pat. No. 5,155,689, issued on Oct. 13, 1992, and assigned to By-Word Technologies, Inc., of Dallas, Tex., discloses a system that connects or disconnects calls based upon interrogation between two modems in a cellular system. That patent is herein incorporated by reference.

If the response is correct, the call is completed at block 338. At block 338, either voice or data or both may be transmitted to or from the communication unit.

For calls from the central host 226 that include voice communications, a voice request is sent to the platform 224 from the central host 226 to communicate with a particular communication unit 216. Any data to be exchanged with that communication unit is exchanged before connecting the voice communications. For example, data from the central host 226 is delivered through the platform 224 to the communication unit 216, and any data at communication unit 216 is delivered at least to platform 224. Next, the platform 224 requests that communication unit 216 to switch to voice, and rings the user of communication unit 216. If no answer is received, then no voice connection is made between communication unit 216 and central host 226. If an answer is received, then platform 224 calls the central host 226 (or any other number provided to the platform 224 by the central host) and patches the appropriate connection.

There will be times when calls cannot be delivered to communication unit 216, for example, when it is out of any cellular system, temporarily out of communication with a cellular system, or powered-down. In such cases, an alert will be set at the platform 224, indicating that a call has not been completed. Upon receipt of a "present" message, for example, when the communication unit 216 to which the call was intended powers up, re-establishes communication or enters a new cellular system, the platform 224 can complete the call. If only data is to be transferred, then this data can be sent from the platform 224 to the communication unit 216. If a voice call had not been completed, then the platform 224 calls the calling party, for example the dispatcher at a central host, and indicates that a call can be or will automatically be placed to the appropriate communication unit 216. Furthermore, the user of a communication unit 216 may be provided with a pager/remote ringer, to ensure that he is aware of any voice calls to his communication unit 216.

Figure 11:
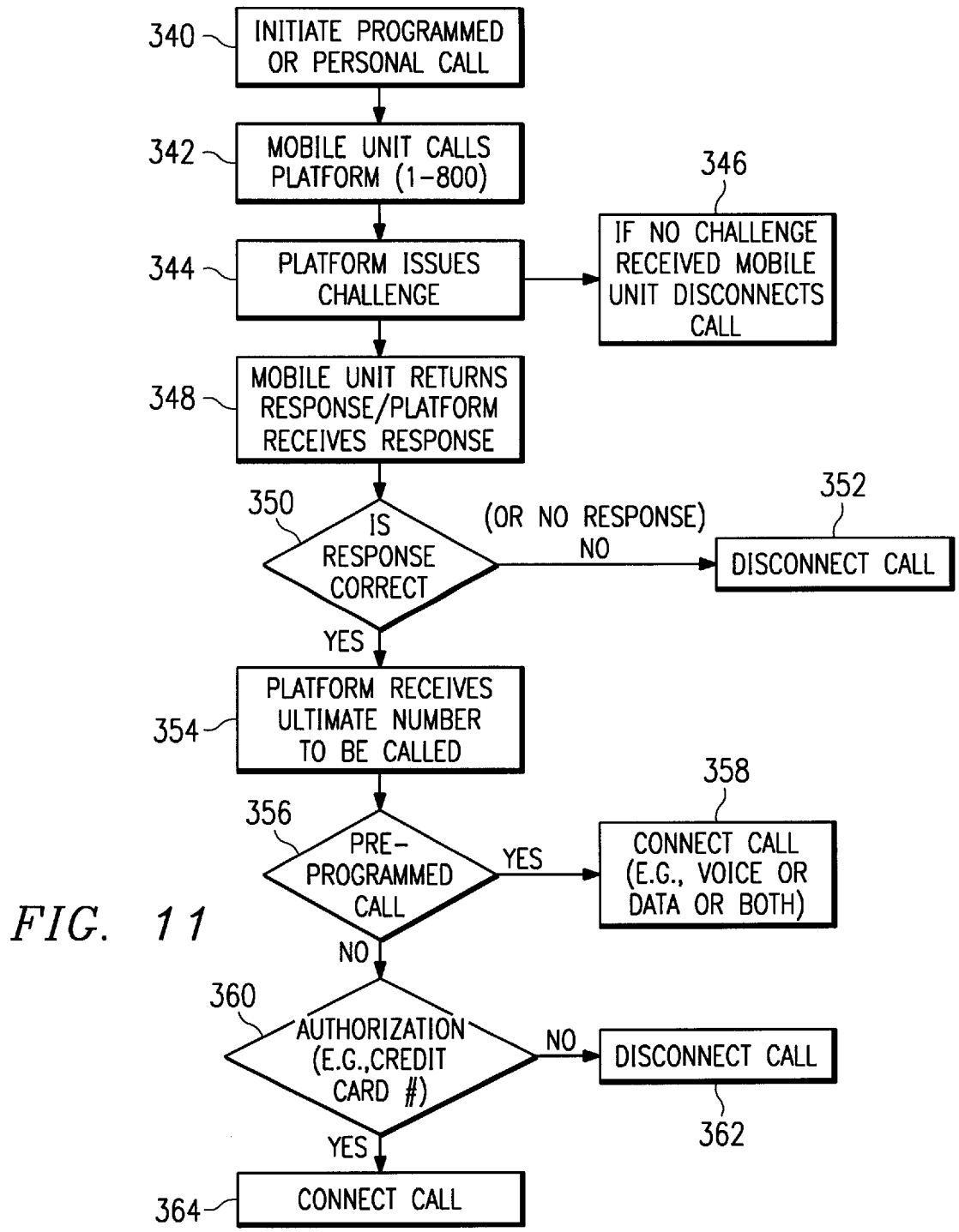
FIG. 11 is a flow diagram of a call from a communication unit according to the teachings of the present invention.

FIG. 11 is a flow diagram of a call from a communication unit 216 according to the teachings of the present invention. At block 340, the communication unit initiates an outgoing call. The outgoing call can be initiated in any of several ways. The communication unit 216 can be programmed such that only certain preprogrammed numbers can be called. These authorized phone numbers are stored in communication unit 216 and can be programmed remotely by the central host 226 or platform 224. Thus, a user of a communication unit would only be able to call these pre-programmed numbers and no others. Alternatively, the communication unit could be configured so as to allow personal calls—if eventually authorized—as well as pre-programmed authorized calls. Regardless of what number is to be eventually called, the communication unit 216 is pre-programmed to first call the platform at block 342. This call, for example, could be a 1-800 number call. Alternatively, arrangements can be made with each cellular system to direct all calls from communication units with particular MIN/ESNs to platform 224. Each local carrier would recognize these particular MIN/ESNs and route their calls to platform 224. Recognition can occur through use of a pre-arranged database, as discussed above. The handshake protocol between the communication unit and the platform is similar to that described in connection with FIG. 10, except that the challenge and response are issued by the platform and communication unit, respectively.

As shown in FIG. 11, at block 344 the platform issues a challenge after modem connection with the communication unit and receipt of a communication unit I.D., such as an MIN. This I.D. provides the platform 224 with knowledge of which communication unit is calling. If no challenge is received, then the communication unit disconnects the call at block 346. If the challenge is received, then the communication unit returns a response and the platform receives the response at block 348. The response is generated by executing the encryption algorithm on the challenge and the key particular to the communication unit. If the response generated by the communication unit does not match the desired response generated by the platform, as determined at block 350, then the call is disconnected by the platform at block 352. If the response is correct, then the platform receives the ultimate number to be called at block 354. If it is determined that this ultimate number to be called is one of the pre-programmed calls at block 356, then the call is connected at block 358. Typically, such a call would be to a user of the central host or a customer. In such a case, voice or data or both can be transmitted. If it is determined at block 356 that the ultimate number to be called is not a pre-programmed number, then an authorization decision is made at block 360. For example, block 360 may compromise a credit card authorization step. If there is no authorization for the call, then the call is disconnected at block 362. If the call is authorized at block 360, for example by entry of a valid credit card number, then the call will be connected at block 364. For data transmissions, the data can be stored at platform 224 and transmitted to central host 226 at various times, as discussed above in connection with "present" messages.

The system of the present invention provides for several layers of fraud prevention. For calls originating at communication unit 216, a first layer of protection is the ability to restrict outgoing calls to only pre-programmed calls. Thus, a user of communication unit 216 may be restricted from calling any unauthorized numbers.

A second layer of fraud prevention is provided by the requirement that all calls to or from a communication unit 216 pass through the platform 224. To restrict incoming calls, the MIN of the communication unit 216 may be chosen so that it is not a dialable number, thereby preventing any unauthorized charges from incoming calls. Arrangements can be made with each cellular carrier in communications system 10 to set aside blocks of non-dialable numbers for use by communication units 216. For outgoing calls, a myriad of "gatekeeping" functions may be performed at the platform 224. For example, the platform 224 may connect only certain authorized calls from the communication unit 216, and require a valid credit card for all others calls. Likewise, the platform 224 can ensure that only authorized calls (such as business calls or credit card authorized calls) are directed to the communication unit 216.

A third layer of protection is provided by the handshake protocol of the present invention. With this handshake protocol, fraudulent procurement of the MIN/ESN of the communication unit 216 will be to no avail without knowledge of the handshake protocol. For example, if a call were placed directly to the communication unit 216, through knowledge of its MIN, the call could not be completed without knowledge of the handshake protocol.

One of the most popular schemes for defrauding cellular users involves obtaining the MIN/ESN of a particular communication unit 216, and then cloning a phone with the same MIN/ESN. Such a cloned phone can then be used in most any cellular system, with the cellular usage charges being billed to the original communication unit 216 as roamer charges. The present invention foils this variety of fraud by requiring that any call using the particular MIN/ESN of communication unit 216 be directed through the platform 224. As discussed above, this requirement can be accomplished by making arrangements with the local cellular carriers to trap calls having particular MIN/ESNs and route them to the platform 224, or alternatively forcing all communication units to only call the platform. The platform 224 then requires successful protocol handshaking to connect the call.

Each communication unit 216 may be equipped with a unique handshake protocol, and the platform 224 would maintain a data base that associated each communication unit 216 with its unique handshake protocol. Alternatively, a library of handshake protocols can be maintained, with each communication unit 216 assigned one of the handshake protocols from that library. The platform 224 would then keep a record of which protocol of the library is assigned to a particular communication unit 216, and perform handshake protocols accordingly.

The handshake protocol described herein provides an excellent means of preventing cellular fraud. It should be understood, however, that communication unit-cellular system-telecommunications platform architecture of the present invention provides technical advantages even without the fraud prevention technique. For example, the ability to gather information on the cellular system location of the communication units 216 allows for efficient call delivery to these communication units.

Throughout this description of the invention, the central host 226, the platform 224, the clearinghouse 222, and the cellular system 212 have been discussed as separate elements. It should be understood that each of these components are logical components, and they may be combined without physical separation. For example, the functions of the platform 224 and the central host 226 may be accomplished at a single site. Likewise, the functions of the platform 224 or clearinghouse 222 may be performed at the local cellular system, for example, at the MTSO.

The present invention has been discussed in connection with cellular systems. It should be understood that it may also be used in connection with satellite telecommunications systems. For example, the transmission towers 218 and MTSO 220 of FIG. 5 may be replaced with, or used in conjunction with, a satellite telecommunications system. Furthermore, transmissions to and from the communication unit 216 may be across various channels, such as separate data and voice channels using, for example, packet data communications.

Figure 12:
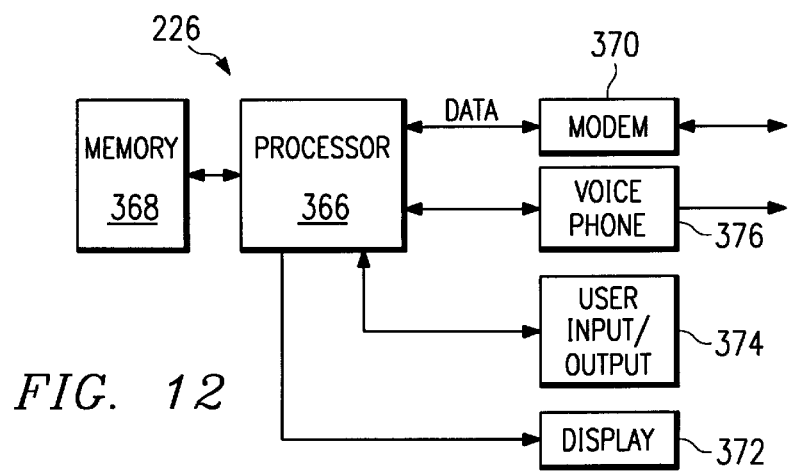
FIG. 12 is a block diagram of a central host constructed according to the teachings of the present invention.

FIG. 12 is a block diagram of the central host 226 constructed according to the teachings of the present invention. As shown in FIG. 12, a central host includes a processor 366 coupled to memory 368. Data transmitted to and received from communication units is transmitted through modem 370 to and from processor 366. Such data may be stored in memory 368 and displayed on display 372. Furthermore, various data, such as data to be transmitted to communication units, is input through user input/output 374. Data which may be input through user input/output 374, for example, may include the text data to be transmitted to a particular communication unit. Such text data could include particular messages, such as changes in delivery schedules, weather conditions, or the like. Such data is displayed on display 268 of communication unit 216, as shown in FIG. 7. Voice communications between a central host and communication units may be made through voice phone 376. Throughout this description in drawings, separate communications have been shown for data and voice, with the data passing through a modem. It should be understood that a single telecommunications line may be used to provide both voice and data without departing from the intended scope of the present invention.

In operation of central host 226 of FIG. 12, data and messages received from communication units may be displayed on display 372 and output, for example in hard copy form, through user input/output 374. For example, a map with location identification of each communication unit associated with the central host is displayed on display 372. In this way, the central host 226 can keep track of the location and progress of communication units and vehicles associated with the communication units. The processor 366 runs software which allows automated sending of data to particular communication units. This data can be automatically generated by processor 366 or input through user input/output 374. Central host can also receive raw location information, that can then be processed in processor 366 to generate latitude and longitude coordinates.

Processor 366 may also, by tracking the locations of communication units, based on longitude and latitude and road map information, determine how many miles each communication unit travels within a particular state. From this information, fleet mileage reports can be generated, for example for trucking companies. These fleet mileage reports can be used to determine the distance traveled and amount of fuel used in various states, which allows for accurate reporting for both fuel and road usage taxes. Furthermore, knowledge of the location of vehicles at particular times, for example from "present" messages or geographic location data, allows for a graphical display of the route of a truck over time and the calculation of estimated times of arrivals and other travel statistics by dispatchers at central hosts. For example, knowledge that a truck is in Dallas, Tex. on Thursday night allows for an estimate of arrival time in Mobile, Ala.

Although the present invention has been described in several embodiments, a myriad of changes, variations, alterations, transformations, and modifications may be suggested to one skilled in the art, and it is intended that the present invention encompass such changes, variations, alterations, transformations, and modifications as fall within the spirit and scope of the appended claims.

What is claimed is:

1. A system for communicating information about an item using a cellular telephone network, comprising:

a messaging unit coupled to the item, the messaging unit having a cellular transceiver coupled to the cellular telephone network, the messaging unit operable to alter an identifier of the cellular transceiver to reflect the information about the item and to transmit the altered identifier of the cellular transceiver; and a remote site coupled to the cellular telephone network and operable to recognize a received altered identifier transmitted by the messaging unit to obtain the information about the item.

2. The system of claim 1, wherein the remote site stores information represented by the altered identifier.

3. The system of claim 2, comprising a host coupled to the remote site and operable to access the information stored by the remote site.

4. The system of claim 1, comprising a switch coupled to the cellular telephone network and operable to recognize the altered identifier, and upon recognition, route the altered identifier to the remote site.

5. The system of claim 1, wherein the messaging unit is attached to a trucking trailer located within a service area of the cellular telephone network.

6. The system of claim 1, wherein the messaging unit is attached to a metering device.

7. The system of claim 1, wherein the remote site is operable to translate the altered identifier into information on a reporting event and to store the information on the reporting event.

8. An apparatus for communicating information about an item using a cellular telephone network, comprising:

a messaging unit coupled to the item, the messaging unit having a cellular transceiver coupled to the cellular telephone network, the messaging unit operable to alter an identifier of the cellular transceiver to reflect the information about the item; and wherein the cellular transceiver transmits the altered identifier to a remote location that recognizes the altered identifier to obtain the information about the item.

9. The apparatus of claim 8, comprising a sensor to generate the information about the item.

10. The apparatus of claim 9, wherein the sensor comprises a positioning system.

11. The apparatus of claim 9, wherein the sensor comprises a metering device.

12. The apparatus of claim 8, wherein the altered identifier comprises an identification number of the cellular transceiver.

13. The apparatus of claim 8, wherein the altered identifier comprises an electronic serial number of the cellular transceiver.

14. The apparatus of claim 8, wherein the cellular transceiver initiates transmission of the altered identifier by dialing a telephone number.

15. The apparatus of claim 8, wherein the cellular transceiver initiates transmission of the altered identifier by issuing a feature request.

16. The apparatus of claim 8, wherein the cellular transceiver initiates transmission of the altered identifier during pre-call validation communication.

17. A method for communicating information about an item using a cellular telephone network, comprising:

receiving the information about the item at a messaging unit;

altering, by the messaging unit, an identifier of a cellular transceiver to reflect the information about the item;

transmitting the altered identifier of the cellular transceiver using the cellular telephone network; and receiving the altered identifier at a remote location, the remote location operable to recognize the altered identifier to obtain the information about the item.

18. The method of claim 17, wherein the information is generated in response to a time-out signal from a real-time clock.

19. The method of claim 17, wherein the information comprises a signal generated by a metering device at a fixed monitoring station.

20. The method of claim 17, wherein the information comprises a sensor signal beyond predetermined limits.

21. The method of claim 17, wherein the information is generated in response to a request to initiate communication with the item.

22. The method of claim 17, wherein the altered identifier is a mobile identification number of the cellular transceiver.

23. The method of claim 17, wherein the step of transmitting the altered identifier is initiated by dialing a telephone number.

24. The method of claim 17, wherein the step of transmitting the altered identifier is initiated by issuing a feature request.

25. The method of claim 17, wherein the step of transmitting the altered identifier is initiated during pre-call validation communication.

26. The method of claim 17, wherein the step of transmitting the altered identifier is initiated upon registration of the cellular transceiver with the cellular telephone network.

27. The method of claim 17, comprising the following steps performed at the remote location:

translating the altered identifier to retrieve the information; and storing the information.

* * * * *